(12) United States Patent
Naito

(10) Patent No.: US 9,577,228 B2
(45) Date of Patent: Feb. 21, 2017

(54) BATTERY PACKS FOR ELECTRIC TOOLS

(71) Applicant: MAKITA CORPORATION, Anjo-shi, Aichi (JP)

(72) Inventor: Akira Naito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 64 days.

(21) Appl. No.: 14/230,628

(22) Filed: Mar. 31, 2014

(65) Prior Publication Data

US 2014/0302369 A1    Oct. 9, 2014

(30) Foreign Application Priority Data

Apr. 4, 2013    (JP) .................................. 2013-078795

(51) Int. Cl.
  *H01M 2/10*    (2006.01)
  *H01M 2/20*    (2006.01)
  *H01M 10/42*   (2006.01)

(52) U.S. Cl.
  CPC .......... *H01M 2/1055* (2013.01); *H01M 2/105* (2013.01); *H01M 2/20* (2013.01); *H01M 2/204* (2013.01); *H01M 10/425* (2013.01); *H01M 2220/30* (2013.01)

(58) Field of Classification Search
  None
  See application file for complete search history.

(56) References Cited

U.S. PATENT DOCUMENTS

| | | | |
|---|---|---|---|
| 6,350,149 B1* | 2/2002 | Nakane ............... | H01M 2/1022 439/500 |
| 2008/0280509 A1* | 11/2008 | Ma .......................... | H02S 40/34 439/837 |
| 2012/0045667 A1* | 2/2012 | Yoneda et al. .................... | 429/7 |

FOREIGN PATENT DOCUMENTS

| | | |
|---|---|---|
| DE | 10 2010 030 723 A1 | 8/2011 |
| EP | 2 421 067 A1 | 2/2012 |
| EP | 2 639 891 A2 | 9/2013 |
| JP | A-2008-10315 | 1/2008 |

OTHER PUBLICATIONS

Hironaka—DE 102010030723A1—Machine translation of German patent publication.*
Extended European Search Report issued in European Patent Application No. 14163436.0 on Aug. 13, 2014.

* cited by examiner

Primary Examiner — Miriam Stagg
Assistant Examiner — Haroon S Sheikh
(74) Attorney, Agent, or Firm — Oliff PLC

(57) ABSTRACT

A battery pack includes a battery side terminal electrically connectible with a device side terminal of a device body that may be a tool body of an electric tool or a charger body of a charger. The battery side terminal includes a first contact portion and a second contact portion. The first contact portion configured to form an electric contact through contact with a first side surface of the device side terminal. The second contact portion configured to form an electric contact through contact with a second side surface opposite to the first side surface of the device side terminal. The first contact portion configured to contact the first side surface in a first contact range having a first length. The second contact portion configured to contact the second side surface in a (Continued)

second contact range having a second length that may be different from the first length.

25 Claims, 15 Drawing Sheets

BATTERY PACKS FOR ELECTRIC TOOLS

This application claims priority to Japanese patent application serial number 2013-78795, the contents of which are incorporated herein by reference.

BACKGROUND OF THE INVENTION

Field of the Invention

Embodiments of the present invention relate to battery packs that can be detachably attached to tool bodies of electric tools or charger bodies of battery chargers.

Description of the Related Art

In recent years, some electric tools utilize battery packs configured as rechargeable batteries that can be detachably attached to tool bodies of electric tools. After having been attached to the tool main body and used, the battery pack may be detached from the tool body for recharging by a charger. The battery pack recharged by the charger may be attached to the tool body again for use. In the following, the tool body, the charger or the like to which the battery pack can be attached will be generally referred to as a "device body" Generally speaking, the battery pack may include an enclosure case also functioning as an outer case, and a battery unit disposed within the enclosure case. The battery unit may include a plurality of battery cells capable of recharging and discharging, and a circuit board for controlling the recharging and discharging of the plurality of battery cells. To this end, the circuit board may include positive and negative recharging/discharging terminals connected to the battery cells for the purpose of recharging/discharging of the battery cells, and signal terminals for transmitting and receiving signals to and from the tool body or the charger to which the battery pack is attached (see, for example, JP-A-2008-10315).

The recharging/discharging terminals and signal terminals may be formed as female terminals allowing connection with male terminals provided on the device body such as the tool body or the charger. The male terminals may have shapes of flat plates. The female terminals may be configured to receive and hold the flat-plate-shaped male terminals. The male terminal may be moved to the direction in which they extend so as to be slid into and held between the female terminals to provide electrical contacts. The electrical contacts may allow transmission and reception of electric power or transmission and reception of communication signals. The recharging/discharging terminals and signal terminals provided on the battery pack will be generally referred to as "(holding type) battery side terminals." The male terminals on the device body side for connection to the female connection terminals will be generally referred to as "(flat-plate type) device side terminals."

The battery pack may receive an operational shock during the operation of an electric tool or may receive vibrations due to the driving of the electric tool. It may be possible that the battery side terminals receiving such a shock and vibration cause simultaneous resonance in both the electrical contact portions. Such simultaneous resonance of both the electrical contact portions may impair the reliability with regard to the electrical connection with the device side terminals.

Therefore, there has been a need of ensuring reliable electrical connection of the battery side terminals with the device side terminals.

According to a first aspect of the disclosure, a battery pack may be detachably mounted to a device body of an electric tool or a charger. The battery pack may include a battery side terminal connectible with a device side terminal. The device side terminal may be configured to have a shape of a flat plate and may have a first side surface and a second side surface opposite to each other. The battery side terminal may include a first contact portion and a second contact portion. The first contact portion may be configured to form an electric contact through contact with the first side surface of the device side terminal. The second contact portion may be configured to form an electric contact through contact with the second side surface of the device side terminal. The first contact portion may contact the first side surface in a first contact range having a first length. The second contact portion may contact the second side surface in a second contact range. The second length may be different from the first length.

By setting the second length to be different from the first length, it may be possible to prevent the first and second contact portions from simultaneously resonate when the battery pack receives an operational shock during the operation of the electric tool or receive vibrations due to the driving of the electric tool. Hence, it is possible to ensure the electric connection through at least one of the electric contacts formed by the first and second contact portions. As a result, it is possible to ensure the electric connection between the battery side terminal and the device side terminal.

The battery side terminal may further include a third contact portion and a fourth contact portion. The third contact portion may be configured to form an electric contact through contact with the first side surface of the device side terminal. The fourth contact portion may be configured to form an electric contact through contact with the second side surface of the device side terminal. The third contact portion may contact the first side surface in a third contact range having a third length. The fourth contact portion may contact the second side surface in a fourth contact range having a fourth length.

In one embodiment, the third length is different from the first length and/or the fourth length is different from the second length. With this arrangement, it may be possible to prevent the first and third contact portions and/or the second and the fourth contact portions from simultaneous resonance. Hence, it is possible to further ensure the electric connection between the battery side terminal and the device side terminal.

In another embodiment, the first contact portion and the fourth contact portion are arranged diagonally to each other, and the fourth length is the same as the first length. Additionally or alternatively, the second contact portion and the third contact portion are arranged diagonally to each other, and the third length is the same as the second length. With this arrangement, it is possible to achieve the contact balance between the first contact portion and the fourth contact portion and/or between the second contact portion and the third contact portion. In addition, it is possible to set such that the contact force applied to the first side surface and the contact force applied to the second side surface are nearer to each other. As a result, it is possible to achieve a balance in the contact forces applied to the device side terminal.

In a further embodiment, the first contact portion and the fourth contact portion are arranged to be opposed to each other, and the fourth length is the same as the first length. Additionally or alternatively, the second contact portion and the third contact portion are arranged to be opposed to each other, and the third length is the same as the second length. With this arrangement, it is possible to achieve the contact balance between the first contact portion and the fourth contact portion and/or between the second contact portion and the third contact portion. In addition, it is possible to set such that the contact force applied to the first side surface and the contact force applied to the second side surface are nearer to each other. As a result, it is possible to achieve a balance in the contact forces applied to the The battery pack may include a plurality of battery side terminals each connectible with a corresponding device side terminal.

According to a second aspect of the disclosure, a battery pack may be detachably mounted to a device body of an electric tool or a charger. The battery pack may include a battery side terminal connectible with a device side terminal. The device side terminal may be configured to have a shape of a flat plate and may have a first side surface and a second side surface opposite to each other. The battery side terminal may include a first contact portion and a second contact portion arranged so as to be opposed to each other. The first contact portion may be configured to form an electric contact through contact with the first side surface of the device side terminal. The second contact portion may be configured to form an electric contact through contact with the second side surface of the device side terminal. The first contact portion may contact the first side surface in a first contact range having a first length. The second contact portion may contact the second side surface in a second contact range.

The battery side terminal may further include a third contact portion and a fourth contact portion arranged so as to be opposed to each other. The third contact portion may be configured to form an electric contact through contact with the first side surface of the device side terminal. The fourth contact portion may be configured to form an electric contact through contact with the second side surface of the device side terminal. The third contact portion may contact the first side surface in a third contact range having a third length. The fourth contact portion may contact the second side surface in a fourth contact range having a fourth length. The third length may be different from the first length and/or the fourth length may be different from the second length.

In one embodiment, the second length may be the same as the first length, and the fourth length may be the same as the third length.

DETAILED DESCRIPTION OF EMBODIMENTS

[First Embodiment]

Figure 1:
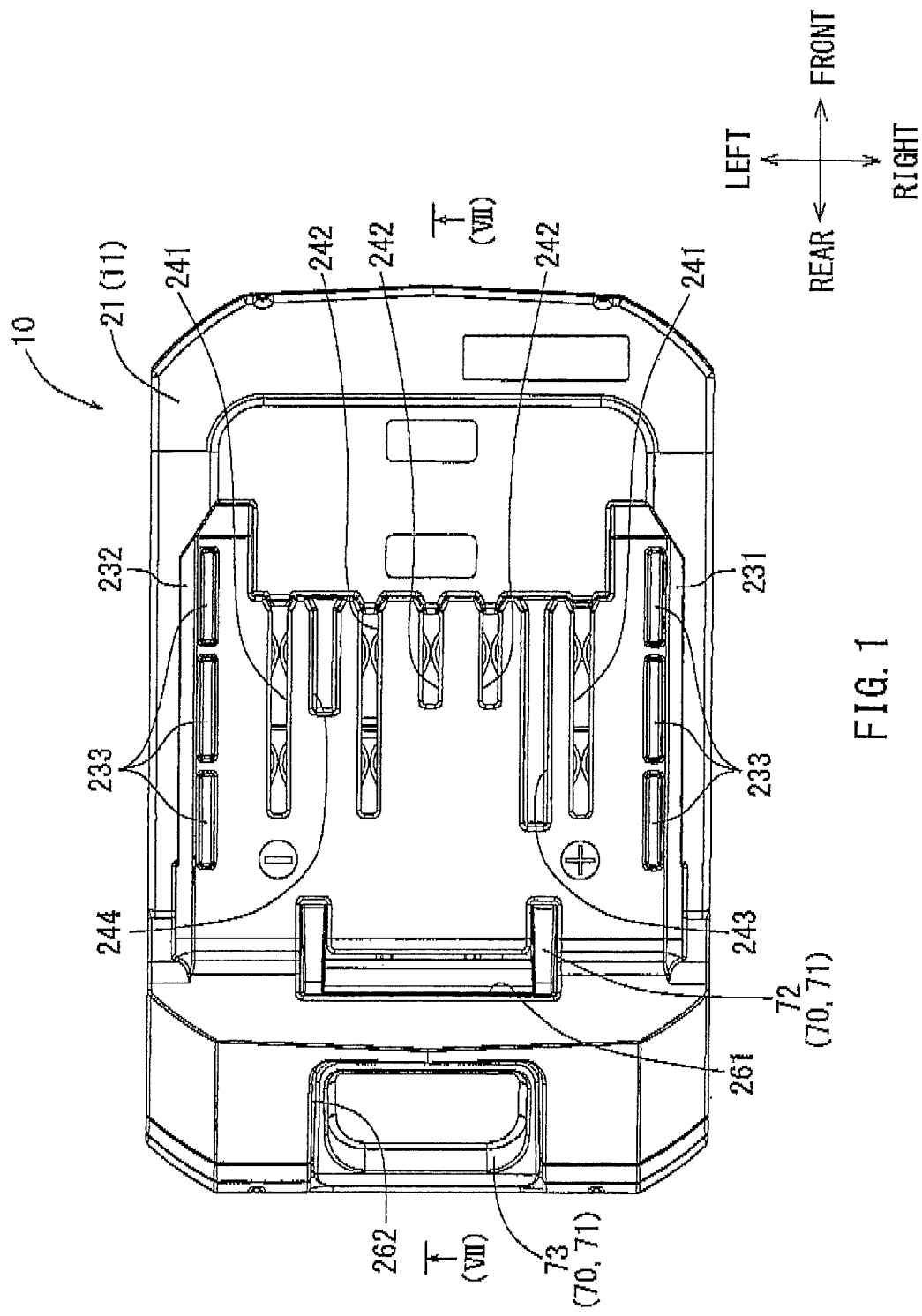
FIG. 1 is an external view illustrating the outward appearance of the upper surface of a battery pack according to a first embodiment.
Figure 2:
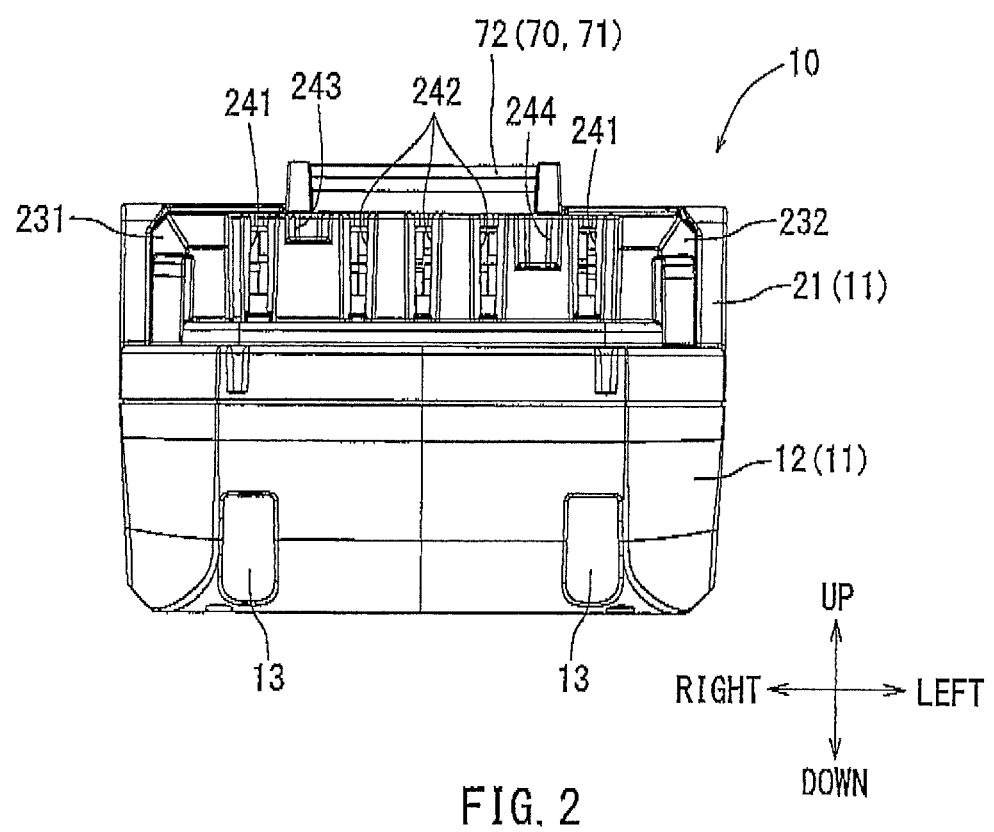
FIG. 2 is an external view illustrating the outward appearance of the front side of the battery pack of FIG. 1.

In the following, an electric tool battery pack according to a first embodiment of the present teachings will be described with reference to FIGS. 1 through 16. In FIG. 1, numeral 10 indicates a battery pack for use with an electric tool such as an electric driver. The battery pack 10 may be a rechargeable battery pack attachable and detachable through sliding with respect to a tool main body of electric tool. The battery pack 10 attached to the tool main body functions as a power source of the electric tool. Thus, when a charge level has been reduced, the battery pack 10 may be detached from the tool main body and may be attached to a battery charger that can recharge the battery pack 10. After completion of recharging by the battery charger, the battery pack 10 may be attached to the tool main body again for use as the power source of the electric tool. The tool main body and the battery charger will be generally referred to as a device body. The front side of the battery pack 10 as indicated in the drawings is set to be a direction of sliding movement of the battery pack 10 for attaching to the device body. Further, the upper side of the battery pack 10 as indicated in the drawings is set to be the upper side with respect to the direction of sliding movement of the battery pack 10 for attaching to the device body.

As shown in FIGS. 1 through 8, the battery pack 10 may generally include a case 11 and a battery main body 30 (see FIG. 4, etc.) installed inside the case 11. The case 11 is configured as an enclosure that serves as an outer casing of the battery pack 10, and, while doing so, serves to accommodate the battery main body 30. The case 11 may have a structure that can be divided into a lower case 12 and an upper case 21. The case 11 may be is formed by vertically joining the lower case 12 and the upper case 21 together. The lower case 12 and the upper case 21 joined together may be maintained in the joined state via screws 19 shown in FIG. 3. The case 11 thus formed through joining may have a box-shape to define a space in which the battery main body 30 can be installed.

Figure 3:
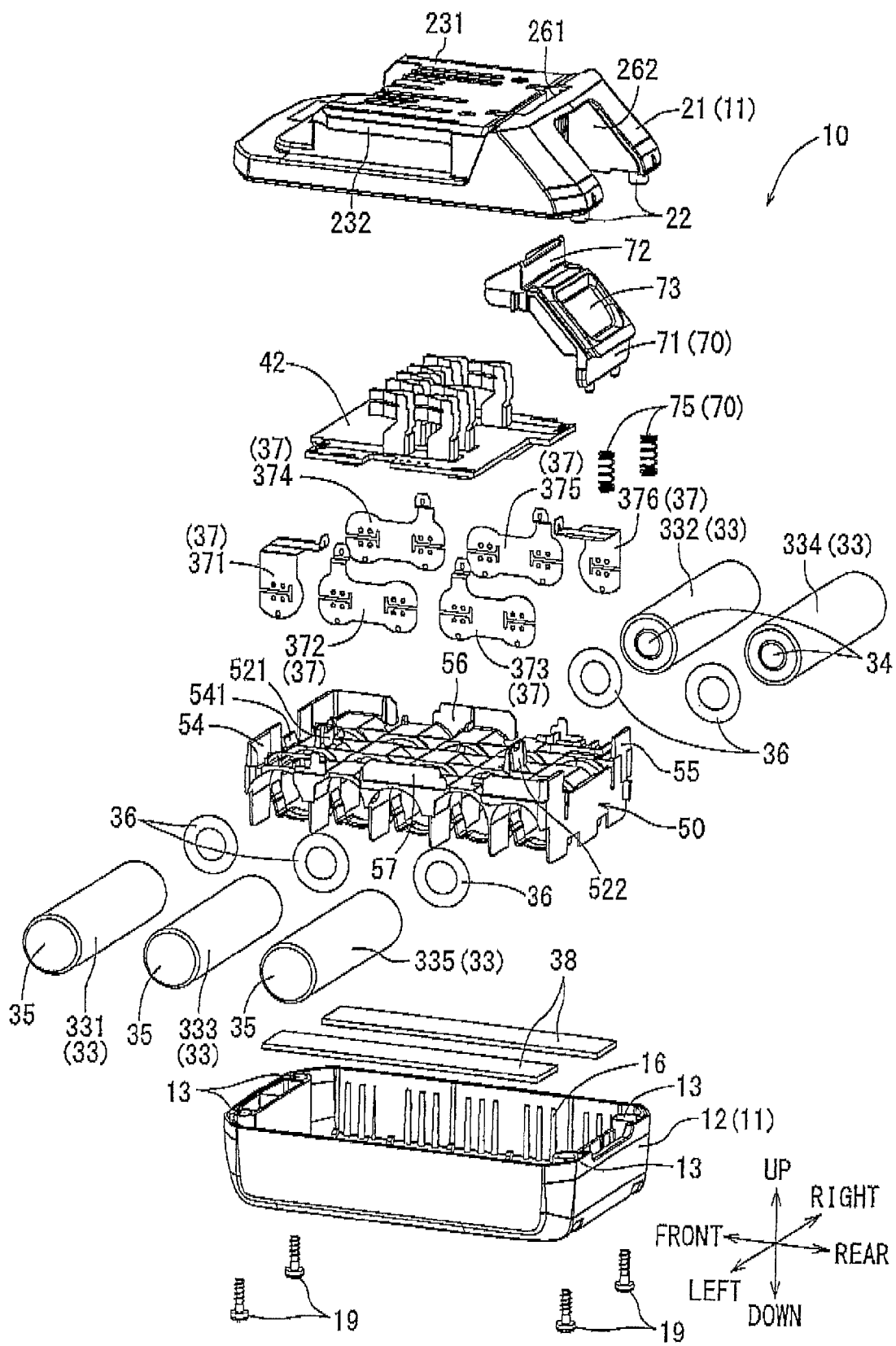
FIG. 3 is an exploded perspective view of the battery pack of FIG. 1.
Figure 4:
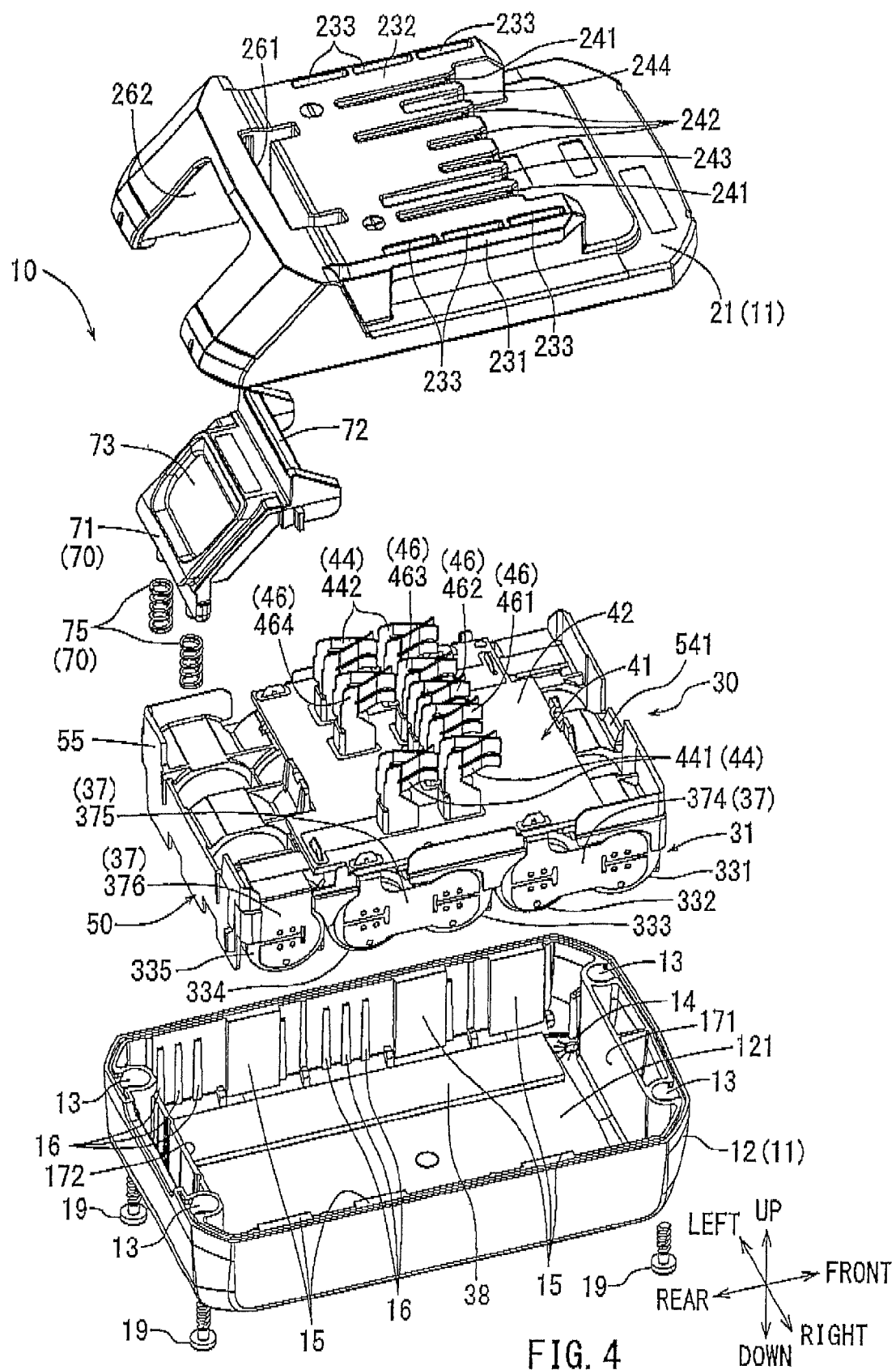
FIG. 4 is an exploded perspective view of the battery pack of FIG. 3 the assembly of which has been completed with respect to the battery main body.
Figure 5:
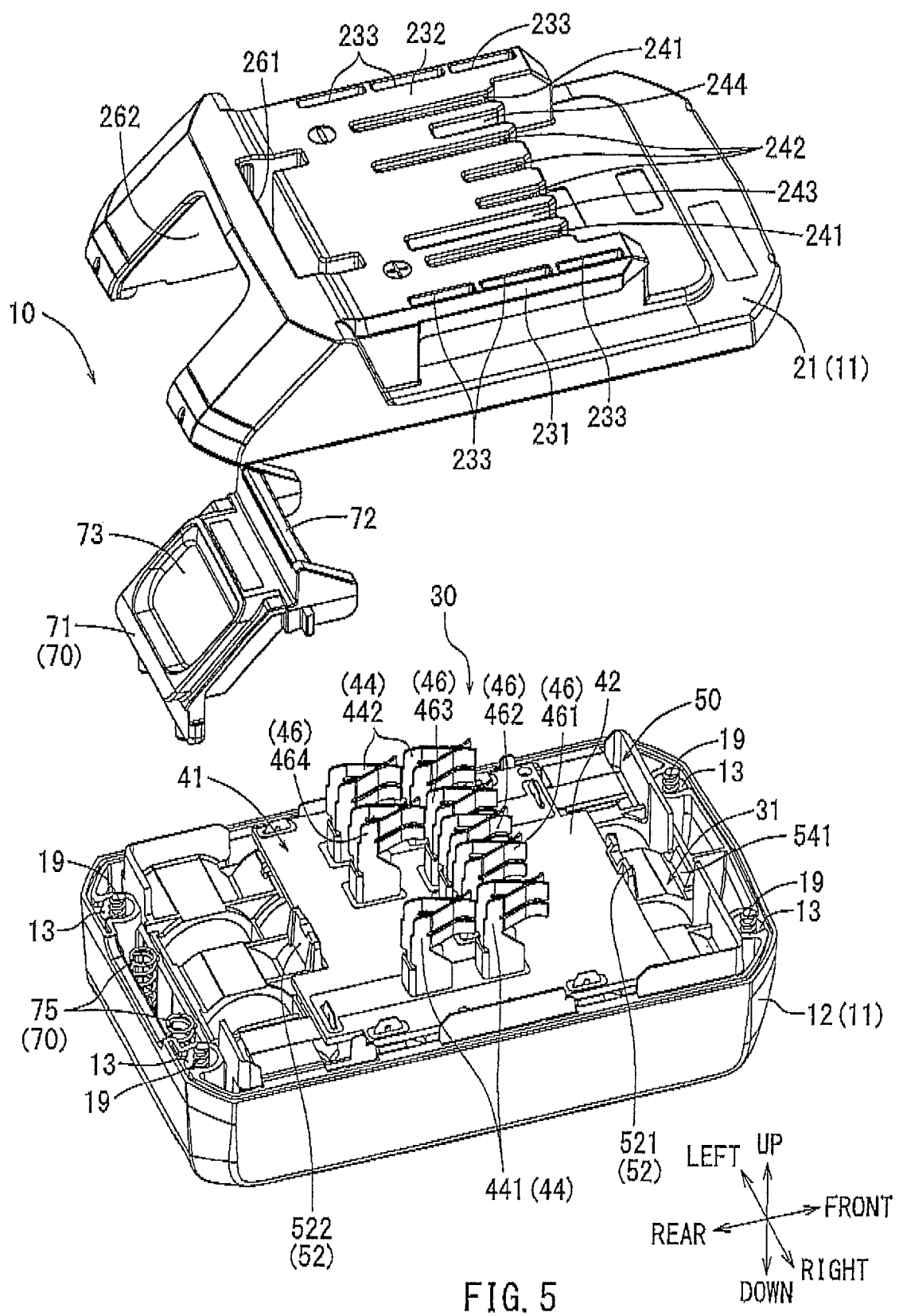
FIG. 5 is an exploded perspective view of the battery pack of FIG. 3 with the battery main body thereof accommodated in a lower case.
Figure 6:
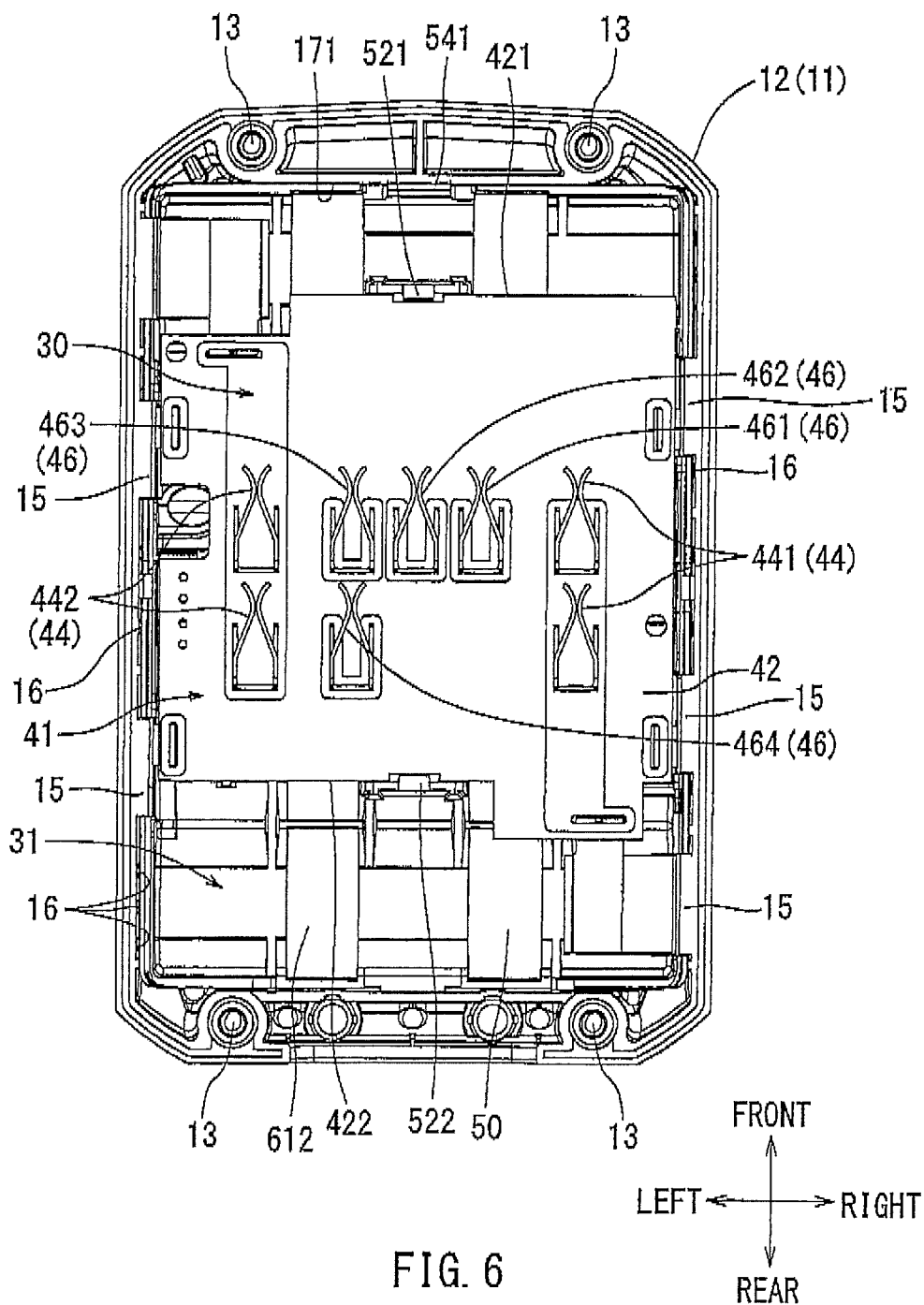
FIG. 6 is a top view illustrating the interior of the lower case accommodating the battery main body.
Figure 7:
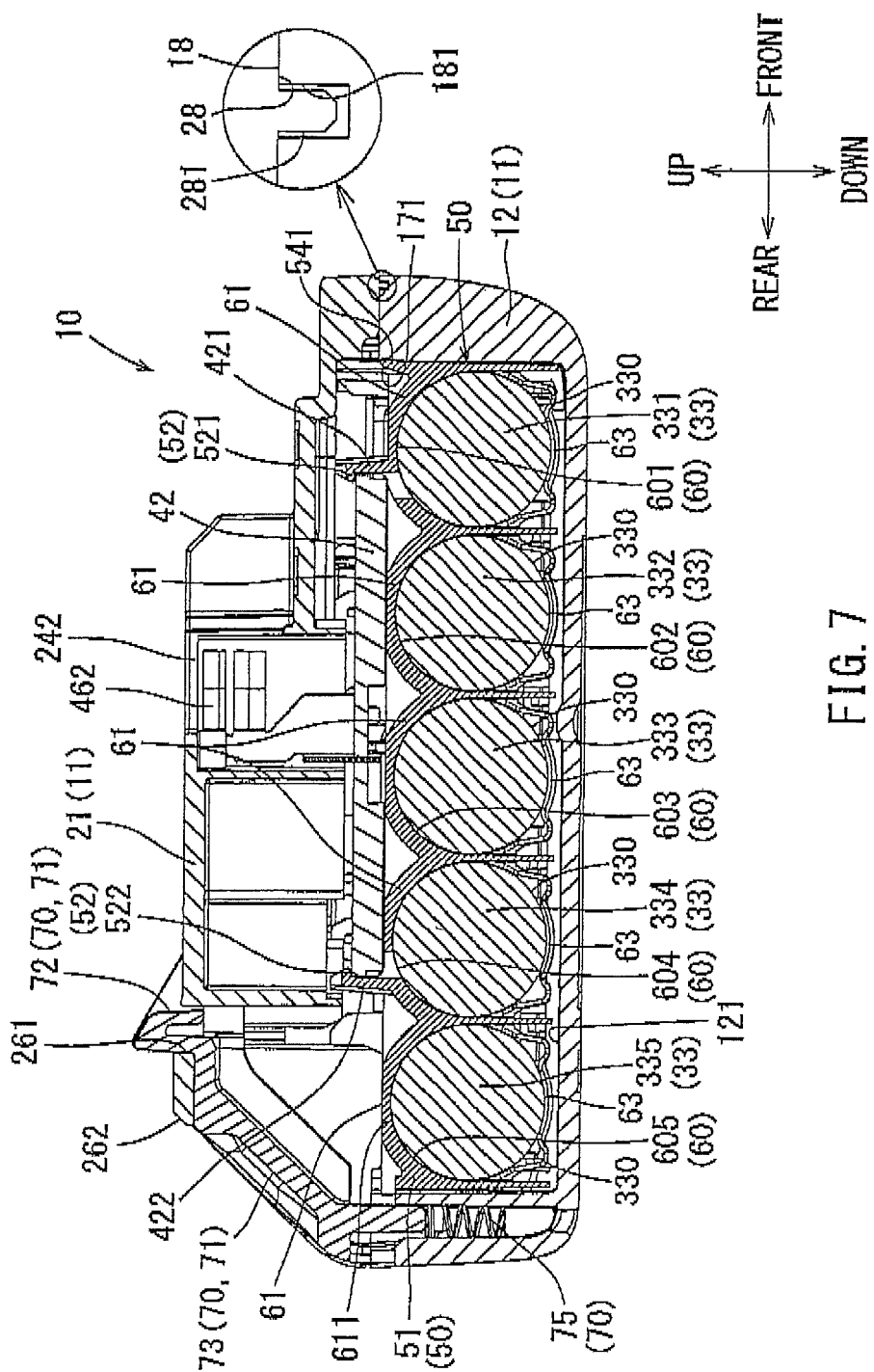
FIG. 7 is a sectional view taken along the arrow line (VII)-(VII) of FIG. 1.
Figure 8:
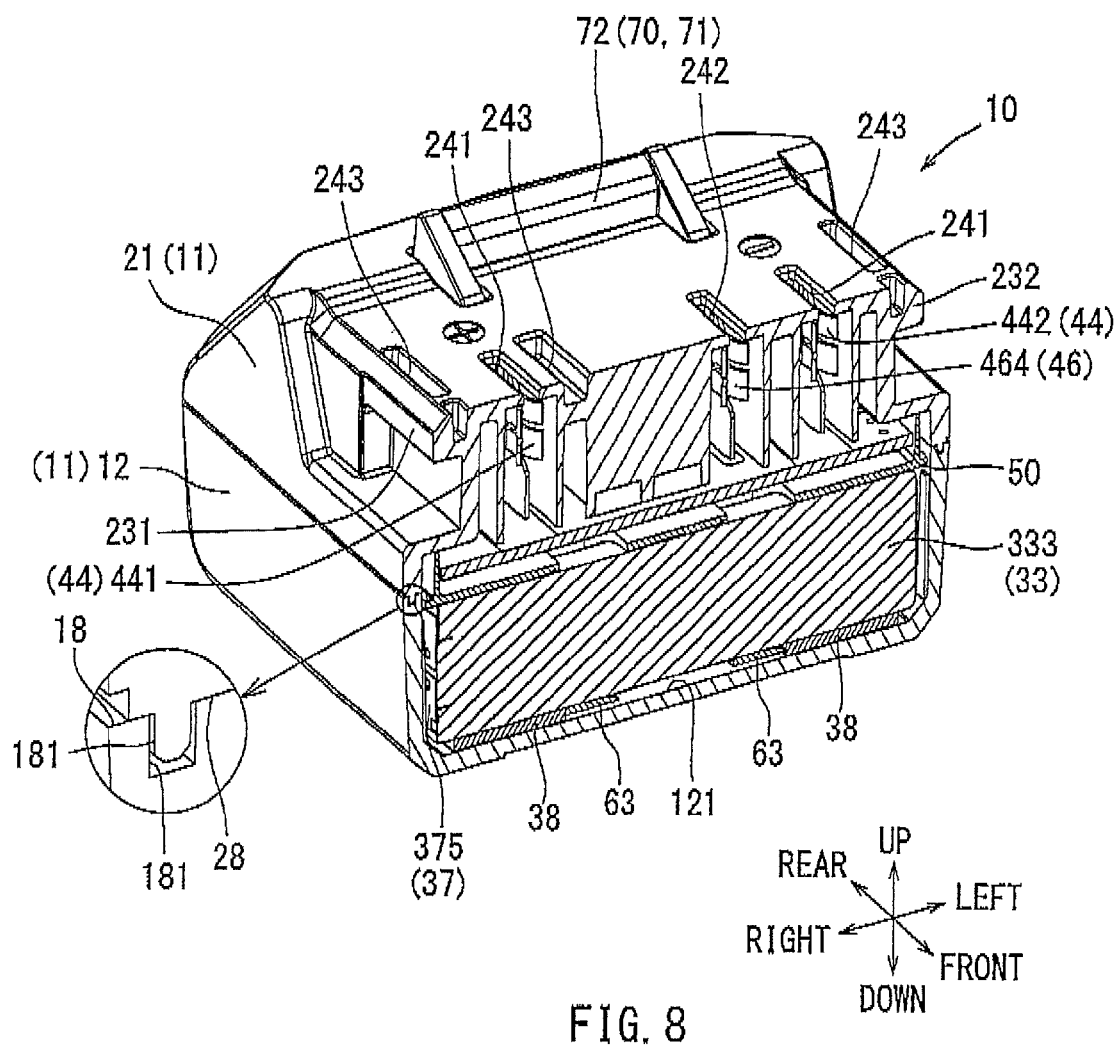
FIG. 8 is a perspective view, partly in section, of the battery pack of FIG. 7 along a central line with respect to the right and left direction.
Figure 9:
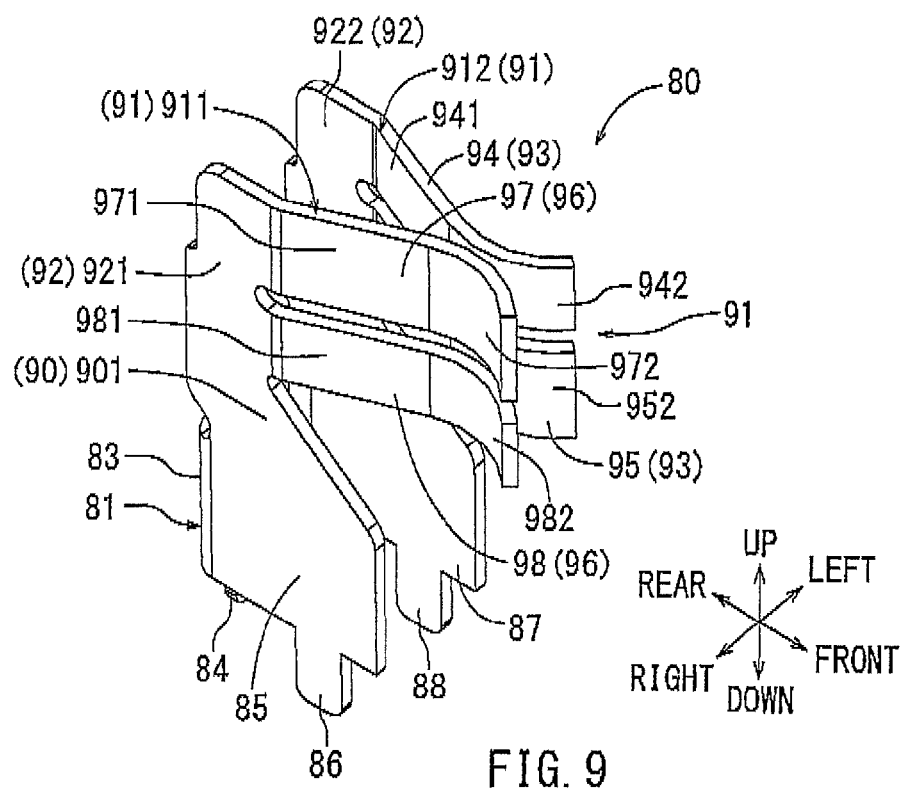
FIG. 9 is an enlarged perspective view of a terminal serving as a recharging/discharging terminal and also as a signal terminal.
Figure 10:
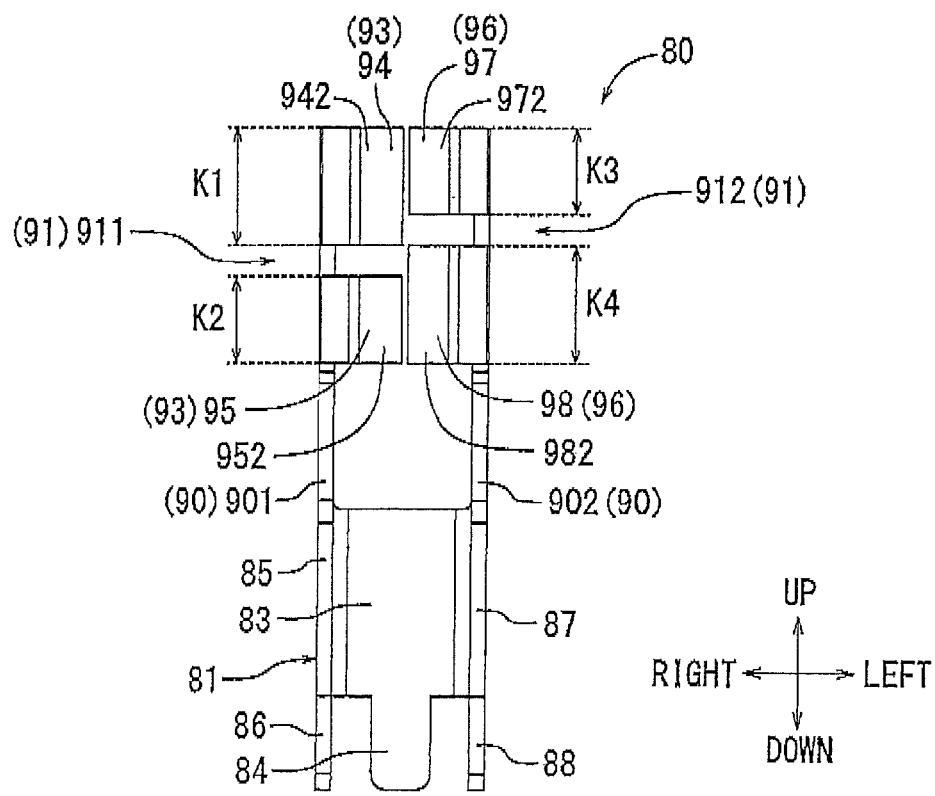
FIG. 10 is a plan view, as seen from the front side, of the terminal of FIG. 9.
Figure 11:
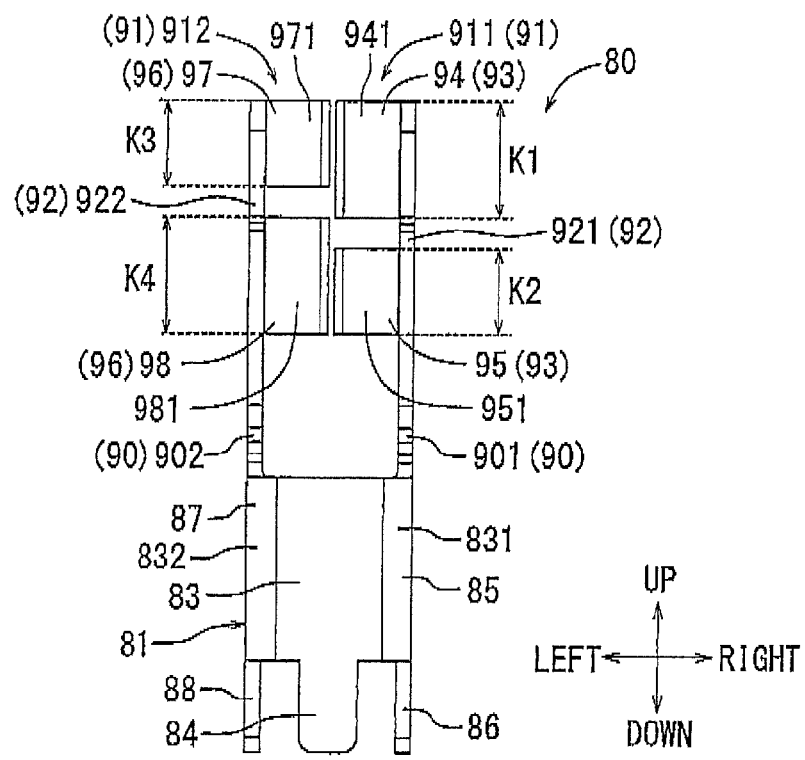
FIG. 11 is a plan view, as seen from the rear side, of the terminal of FIG. 9.
Figure 12:
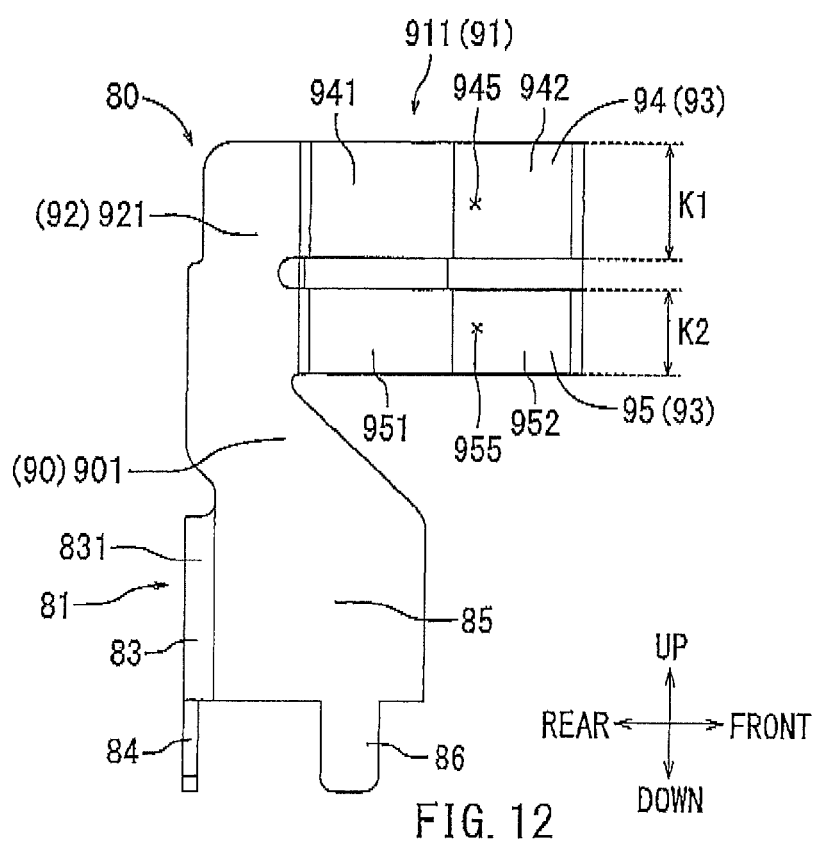
FIG. 12 is a left-hand side view illustrating the left-hand side surface of the terminal of FIG. 9.
Figure 13:
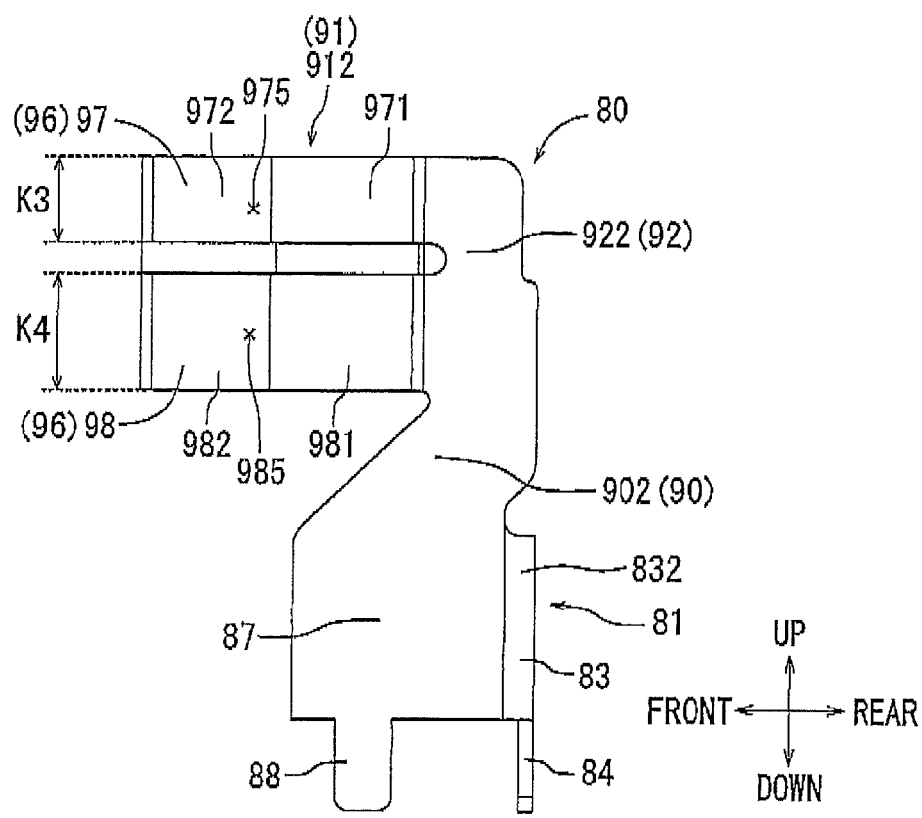
FIG. 13 is a right-hand side view illustrating the right-hand side surface of the terminal of FIG. 9.

As shown in FIGS. 3 and 4, the lower case 12 is formed substantially as a box with an upper side opened. The lower case 12 may mainly accommodate a battery portion 31 of the battery main body 30 as will be described below. More specifically, as shown in FIG. 5, the lower case 12 is formed so as to have lengths in forward and rearward direction, left and right direction, and upward and downward direction, which allow accommodation of five battery cells 33 arranged in the forward and rearward direction so as to be parallel to each other. That is, the lower case 12 is formed such that a circuit board 42 (control unit 41) of the battery main body 30 is positioned on the upper side of the accommodation region of the lower case 12.

As shown in FIG. 4, at the corners between four side walls of the lower case 12, there are provided screw-insertion holes 13. Further, support ribs 15 and presser ribs 16 are provided on the inner side surfaces of the right and left side walls of the lower case 12. Each of the support ribs 15 has a substantially rectangular shape. The support ribs 15 may be fitted into corresponding gaps provided in a cell holder 50 for preventing movement in the forward and rearward direction of the cell holder 50 within the lower case 12. The presser ribs 16 are formed as linear projections extending in the vertical direction. The presser ribs 16 may contact lead plates 37 so as to press the lead plates 37 toward the battery cells 33 side. The presser ribs 16 may be configured such that the range of contact with the lead plate 37 increases in the downward direction. The control unit 41 arranged on the upper side of the battery portion 31 may be accommodated in the upper case 21 as will be described below.

As shown in FIG. 3, the upper case 21 is arranged on the upper side of the lower case 12. The upper case 21 may be joined to the lower case 12 by using the screws 19. That is, the upper case 21 is provided with threaded bosses 22 for engagement with the screws 19 that are passed through the screw-insertion holes 13 of the lower case 12. The upper case 21 may have a substantially box-shape with its lower side opened and can accommodate the control unit 41 of the battery main body 30 as will be described below.

The upper case 21 serves as a connection-side case when the battery pack 10 is slide-attached to the device body (the electric tool main body or the charger). In the middle portion of the upper case 21, there are provided a pair of right and left slide guide portions 231 and 232. The slide guide portions 231 and 232 serve as a slide guide for attachment of the battery pack 10 to the device main body such as the tool main body. For this purpose, the slide guide portions 231 and 232 may have a flange-like shape protruding to the right and left sides and extending in the forward and rearward direction for enabling the slide-attachment. Each of the slide guide portion 231 and 232 may be provided with recesses 233. When the battery pack 10 is attached to the electric tool, the recesses 233 may serve to suppress transmission of vibrations to the battery cells 33 during the driving of the electric tool. Further, the upper case 21 may be provided with recharging/discharging terminals 44 and signal terminals 46 that can be electrically connected to the corresponding terminals of the device main body. To this end, recharging/discharging terminal slits 241 and signal terminal slits 242 may be formed in the upper case 21. These slits 241 and 242 may be configured to allow insertion of male external terminals in the form of plates. Further, the upper case 21 may be provided with guide slits 243 and 244 that serve as a guide for the slide-attachment of the battery pack 10 to the device main body.

Further, the upper case 21 may be provided with a hook opening 261 and an operation opening 262. The hook opening 261 may allow a hook portion 72 of a male hook mechanism 70 to protrude to the exterior. The hook portion 72 protruding from the hook opening 261 can engage a female portion of the device main body (electric tool or the charger (not shown) located on the outer side of the upper case 21. The operation opening 262 allows an operation portion 73 of the male hook mechanism 70 to be exposed to the exterior. The operation portion 73, which can be operated via the operation opening 262, allows the user to release the engagement of the hook portion 72 protruding outwardly from the hook opening 26.

The male hook mechanism 70 may be configured to releasably lock the battery pack 10 against the device main body when the battery pack 10 is slide-attached to the device main body 10. That is, as shown in FIG. 3, etc., the male hook mechanism 70 may include a hook-shaped structure 71 and urging springs 75 urging the hook-shaped structure 71 in the locking direction. The hook-shaped structure 71 may serve as a hook and may also serve a finger-engaging member. The hook-shaped structure 71 may include the hook portion 72 and the operation portion 73. The male hook mechanism 71, constructed as described above, can automatically lock the hook portion 72 against the male portion of the device main body due to the urging force of the urging springs 75. When the operation portion 73 is pulled downward against the urging force of the urging springs 75, it is possible to release the lock of the hook portion 72 against the female portion of the device main body, making it possible to slide-detach the battery pack 10 from the device main body.

As described above, the upper case 21 arranged on the upper side is fixed to the lower case 12 configured as described above by the screw members 19 to form the case 11. A structure may be provided for ensuring the mutual connection state between that the lower case 12 and the upper case 21. That is, as shown in the encircled portions of FIGS. 7 and 8, an opening end edge 18 of the lower case 12 upwardly open may be provided with a fit-engagement groove 181 extending along the opening end edge 18. The fit-engagement groove 181 is formed at the central portion in the thickness direction of the opening end edge 18 so as to extend along the opening end edge 18. The fit-engagement groove 181 may be provided so as to extend along all of the front, rear, right, and left sides of the opening end edge 18 of the lower case 12. The width of the fit-engagement groove 181 may be substantially one third of the thickness of the open end edge 18. The depth of the fit-engagement groove 181 may be substantially the same as the thickness of the opening end edge 18.

On the other hand, an opening end edge 28 of the upper case 21, which is downwardly open, is provided with a fit-engagement linear projection 281 to be fit-engaged with the fit-engagement groove 181. The fit-engagement linear projection 281 is provided so as to extend along all of the front, rear, right, and left sides of the opening end edge 28 of the upper case 21. The fit-engagement linear projection 281 may have a protrusion width and a protrusion length corresponding to the depth of the fit-engagement groove 181 provided in the lower ease 12. The protrusion width of the fit-engagement linear projection 281 may be substantially one third of the thickness of the opening end edge 28. The protrusion length of the fit-engagement linear projection 281 may be substantially equal to the thickness of the opening end edge 28.

The above-described relationship between the fit-engagement groove 181 and the fit-engagement linear projection 281, which are fit-engaged with each other, helps to firmly connect the opening end edges 18 and 28 to each other. That is, even if a relative load is applied to the upper case 21 from the lower case 12, it is possible to firmly suppress positional displacement with respect to each other.

Next, the battery main body 30 installed in the case 11 will be described. The battery main body 30 has various functions for enabling the battery pack 10 to serve as a rechargeable battery. As shown in FIG. 4, etc., the battery main body 30 is equipped with the battery portion 31 and the control unit 41. As shown in FIG. 3, the battery portion 31 has five battery cells 33 (331, 332, 333, 334, and 335). The battery cells 33 may be rechargeable/dischargeable ones that are generally used, and each has a cylindrical outer configuration. Starting from the front side, the battery cells 33 includes a first battery cell 331, a second battery cell 332, a third battery cell 333, a fourth battery cell 334, and a fifth battery cell 335. The five battery cells 33 are laid horizontally to extend in the right and left direction, and are arranged in parallel in the front and rear direction. In this connection, positive electrodes 34 and negative electrodes 35 of the five battery cells 33 are positioned at the right and left side ends of the battery cells 33. As shown in FIG. 3, an insulation sheet 36 may be attached to each of the positive electrodes 34.

The electrodes 34 and 35 at the right and left ends of the five battery cells 33 are electrically connected via lead plates 37 (371, 372, 373, 374, 375, and 376). That is, as shown in FIG. 3, a first lead plate 371, a second lead plate 372, a third lead plate 373, a fourth lead plate 374, a fifth lead plate 375, and a sixth lead plat 376 are respectively welded to the electrodes 34 and 35 at the right and left ends of the battery cells 33. These lead plates 37 (371, 372, 373, 374, 375, and 376) serve as electrode members or electrodes according to the present disclosure. The battery cells 33 are retained by a cell holder 50 that will be described in detail later. Numeral 38 indicates buffer mats laid on an inner bottom surface 121 constituting the inner surface of the lower case 12. The buffer mats 38 may be molded from elastomeric resin into a sheet configuration. The buffer mats 38 are formed so as to extend over the range in the front and rear direction, in which the battery cells 33 are arranged. The buffer mats 38 may be arranged at appropriate intervals for positioning of cell retaining portions 63 of the cell holder 50 that will be described in detail later.

The control unit 41 is arranged on the upper side of the battery portion 31. The control unit 41 may have the control board 42 configured to perform various control processing operations. The circuit board 42 may have a microcomputer that may monitor the condition of the battery cells 33 via the lead plates 37 connected thereto and may perform controls related to recharging and discharging. To this end, the upper ends of the lead plate 37 attached to the electrodes 34 and 35 at the right and left ends of the battery cells 33 are electrically connected to the circuit board 42. More specifically, the upper ends of the lead plates 37 (371, 372, 373, 374, 375, and 376) are electrically mechanically connected to the circuit board 42 through welding. In this way, the lead plates 37 are connected to the electrodes 34 and 35 of the battery cells 33 and to the circuit board 42 through welding.

Figure 20:
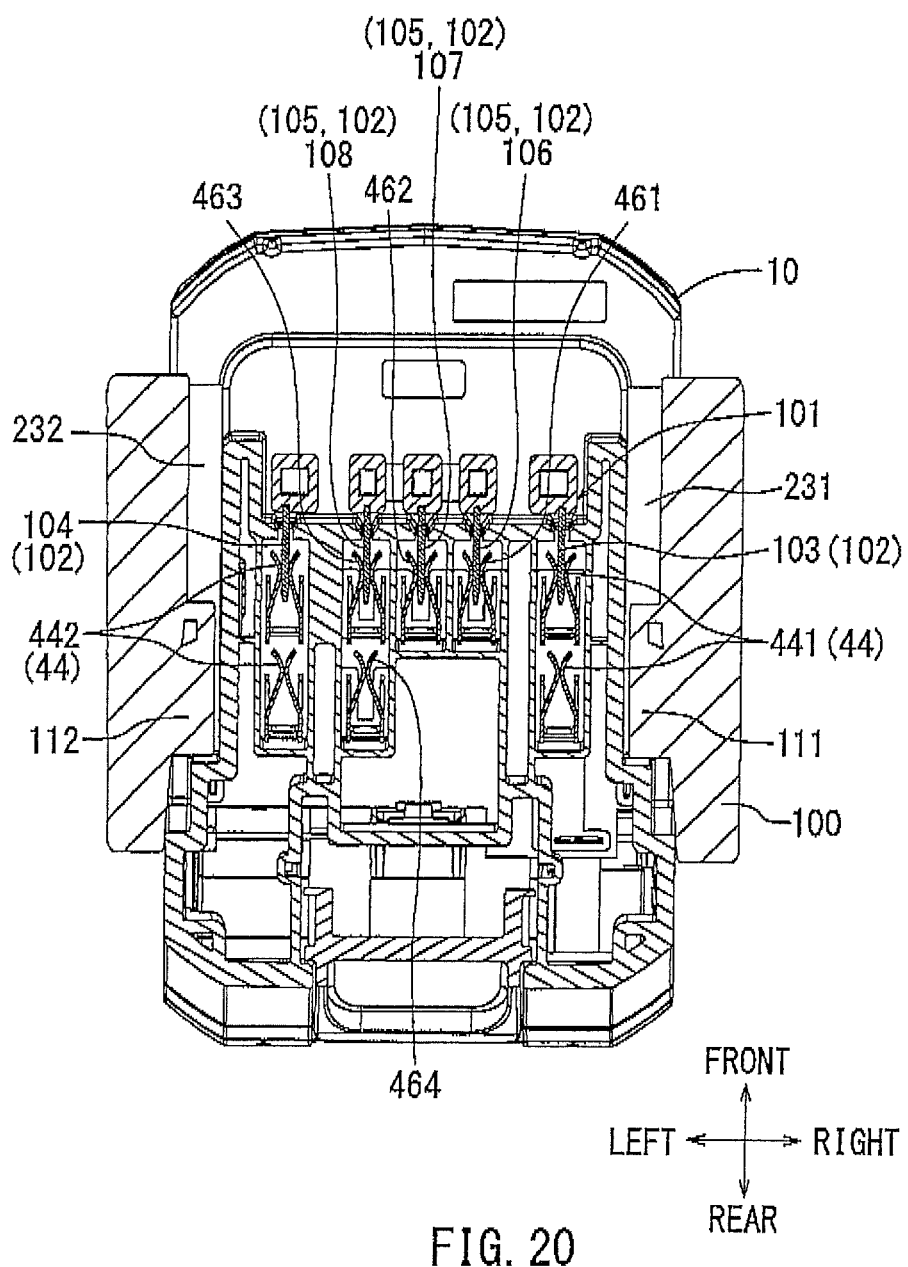
FIG. 20 is a sectional view illustrating the battery pact attached to a charger as an example.

The recharging/discharging terminals 44 and the signal terminals 46 are provided on the upper surface of the circuit board 42. As will be described in detail later, the recharging/discharging terminals 44 and the signal terminals 46 may be electrically connected to a charger 100 as shown in FIG. 20. The recharging/discharging terminals 44 and the signal terminals 46 mounted to the circuit board 42 as terminals 80 are mounted to the circuit board 42 as will be described later. When attaching the battery pack 10 to the tool main body (apparatus main body) as the power source, the recharging/discharging terminals 44 function as discharging terminals. When attaching the battery pack 10 to the charger (apparatus main body), the recharging/discharging terminals 44 function as recharging terminals. Therefore, the recharging/discharging terminals 44 may have positive connection terminals 441 for connection with the positive terminals on the apparatus main body side, and negative connection terminals 442 for connection with the negative terminals on the apparatus main body side. Each of the positive connection terminals 441 and the negative connection terminals 442 has two terminals arranged in parallel in the front and rear direction.

Four signal terminals 46 are configured as terminals for transmitting and receiving information between the battery pack and the apparatus main body when the battery pack 10 is attached to the apparatus main body. That is, a first signal terminal 461 serves as a signal terminal for transmitting a recharging complete signal to the charger connected. More specifically, when the control unit 41 of the circuit board 42 determines that the voltage of the battery cells 33 exceeds a given threshold value, the first signal terminal 461 transmits a recharging complete signal to the charger connected so as to forcibly stop the recharging control of the charger connected. A second signal terminal 462 serves as a signal terminal for always transmitting monitor voltage information regarding the temperature of the battery cells 33 to the charger. More specifically, when the temperature of the battery cells 33 has reached an abnormal level, the control unit 41 determines that the battery cells 33 have reached an abnormal temperature, and the second signal terminal 462 transmits the monitor voltage information to the charger connected for stopping the recharging control of the charger. A third signal terminal 463 serves as a signal terminal for transmitting an overcharging prevention signal to the charger. More specifically, when the recharging control of the charger has not been stopped based on the signal from the first signal terminal 461, the third signal terminal 463 transmits the overcharging prevention signal to the charger for stopping the recharging control of the charger. Therefore, the battery pack 10 may not undergo overcharging. A fourth signal terminal 464 serves as a signal terminal for transmitting an over-discharging prevention signal to the tool main body. More specifically, when the control unit 41 of the circuit board 42 determines that the voltage of the battery cells 33 exceeds a given threshold value, the fourth signal terminal 464 transmits a discharge stop signal to the tool main body so as to forcibly stop the discharge control of the tool main body. The six signal terminals 46 are arranged such that those signal terminals 46, between which the electrical connection is undesirable, are situated as far as possible from each other. The information transmitted and received by the signal terminals 46 may not be limited to that described above but may be any other information related to the battery pack 10 and the apparatus main body. Further, the signals transmitted and received may be that processed by the control unit 41 of the circuit board 42.

To accommodate and retain the five battery cells 33 (331, 332, 333, 334, and 335) in the interior of the lower case 12, the cell holder 50 is formed as a holder for integrating the five battery cells 33 together. The cell holder 50 may be molded from any suitable plastic resin. The cell holder 50 may generally include an external contour body 51 constituting the framework of the cell holder 50 and cell accommodation portions 60 (601, 602, 603, 604, and 605) supported by the external contour body 51 and accommodating the battery cells 33.

The external contour body 51 is configured to support the cell accommodation portions 60 while being supported by the case 11. More specifically, the external contour body 51 supports accommodation space defining portions 61 each defining the cell accommodation portion 60. The external contour body 51 may have a board joining portion 52. The board joining portion 52 is a portion through which the cell holder 50 is engaged with or joined to the circuit board 42. The board joining portion 52 may have a front side engaging hook 521 and a rear side engaging hook 522 for engaging with the circuit board 42. In this way, the board joining portion 52 having the front side engaging hook 521 and the rear side engaging hook 522 serves to join the cell holder 50 to the circuit board 42.

The cell accommodation portions 60 accommodate the five battery cells (331, 332, 333, 334, and 335). Thus, the cell accommodation portions 60 are formed to define spaces capable of accommodating the battery cells 33. The cell retaining portions 63 may be disposed at the cell accommodation portion 60 and may be configured to hold the accommodated battery cells 33. More specifically, the cell retaining portions 63 may be pressed against the outer peripheral surfaces of the battery cells 33, so that the battery cells 33 can be held in position.

Each of the recharging/discharging terminals 44 and of the signal terminals 46 may be mounted to the circuit board 41 as the terminal 80 having the same construction are mounted to the circuit board 42. The sectional view of FIG. 20 shows the section of the connection portion where the battery pack 10 is attached to the charger 100 as the apparatus main body. As shown in FIG. 20, the charger 100 may be provided with a battery pack attachment portion 101 for the slide-attachment of the battery pack 10. Provided on the battery pack attachment portion 101 are device side terminals 102 that can be connected to the recharging/discharging terminals 44 and the signal terminals 46. The device side terminals 102 may include a positive terminal 103, a negative terminals 104, and transmission/reception terminals 105. The positive terminal 103 can be connected to positive connection terminals 441 constituting one of the recharging/discharging terminals 44 of the battery pack 10. The negative terminal 104 can be connected to negative connection terminals 442 constituting the other of the recharging/discharging terminals 44 of the battery pack 10. There are provided three transmission/reception terminals 105: a first transmission/reception terminal 106, a second transmission/reception terminal 107, and a third transmission/reception terminal 108. The first transmission/reception terminal 106 can be connected to the first signal terminal 461, The second transmission/reception terminal 107 can be connected to the second signal terminal 462. The third transmission/reception terminal 108 can be connected to the third signal terminal 463. The charger 100 may include no transmission/reception terminal that can be connected to the fourth signal terminal 464 provided on the battery pack 10. The positive terminal 103, the negative terminal 104, and the first through third transmission/reception terminals 106 through 108 provided on the battery pack attachment portion 101 of the charger 100 are arranged in parallel to each other. The battery pack attachment portion 101 of the charger 100 may include guide portions 111 and 112 that constitute mating or complementary components for the slide guide portions 231 and 232 of the battery pack 10.

The terminals 80 constituting the recharging/discharging terminals 44 and the signal terminals 46 will be described with reference to FIGS. 9 through 16. The recharging/discharging terminals 44 (the positive connection terminal 441 and the negative connection terminal 442) and the signal terminals 46 (the first through fourth signal terminals 461 through 464) are provided by installing six terminals 80 of the same construction on the circuit board 42.

The terminals 80 serves as the battery side terminals according to the present disclosure. Each terminal 80 may be formed through cutting and bending of a metal plate having electrical conductivity. As shown in FIGS. 9 through 16, each terminal 80 may generally include a three-side support base body 81 and contact forming portions 91. The three-side support base body 81 mainly constitutes a support structure of the terminal 80 for mounting on the circuit board 42. Therefore, the three-side support base body 81 may preferably be rigid enough to support the terminal 80 against the circuit board 42 when mounted to the circuit board 42.

Figure 14:
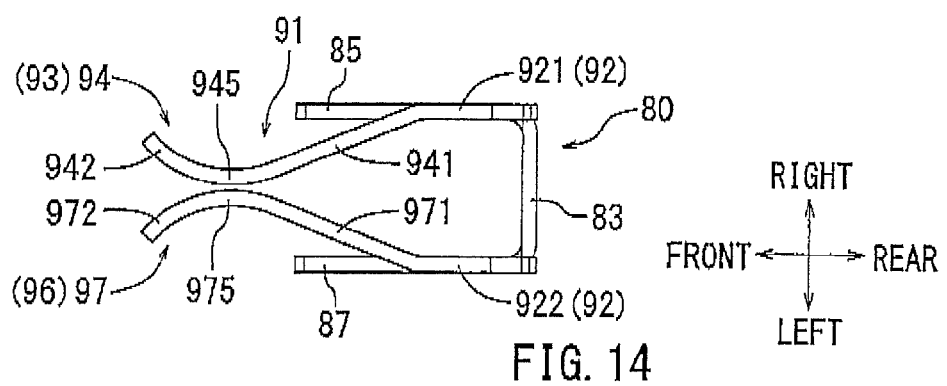
FIG. 14 is a top view of the terminal of FIG. 9 as seen from above.
Figure 15:
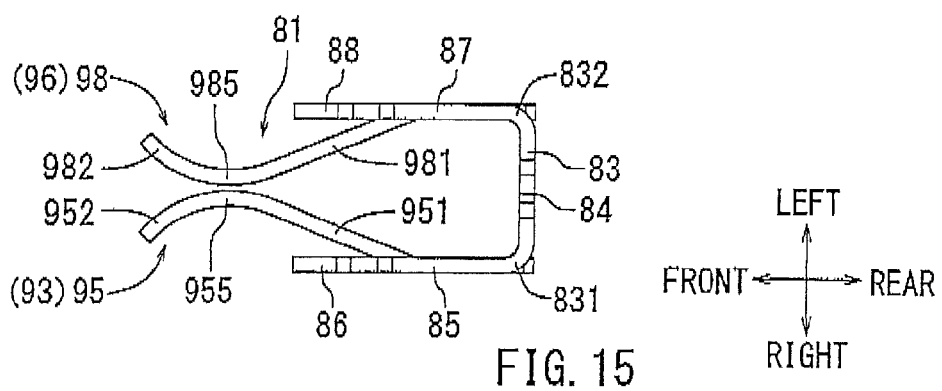
FIG. 15 is a bottom view of the terminal of FIG. 9 as seen from below.

As shown in FIGS. 14 and 15, the three-side support base body 81 may be formed in a U-shaped with three sides as seen from above or below. That is, the three-side support base body 81 has a rear side wall 83 arranged on the rear side, a right-hand side wall 85 arranged on the right-hand side, and a left-hand side wall 87 arranged on the left-hand side. The rear side wall 83 is formed as a wall extending in the right and left direction. Thus, the rear side wall 83 is formed as a wall facing in the front and rear direction. A circuit contact portion 84 may protrude downwards from the lower end of the rear side wall 83. The circuit contact portion 84 constitutes a contact structure that is electrically connected to the circuit board 42. Thus, the lower end of the rear side wall 83 is in contact with the upper surface of the circuit board 42.

The right-hand side wall 85 and the left-hand side wall 87 extends to the left-hand and right-hand sides from the rear side wall 83. More specifically, the right-hand side wall 85 is continuously connected with a right-hand end edge 831 of the rear side wall 83 so as to protrude forwards from the right-hand end edge 831. Similarly, the left-hand side wall 87 is continuously connected with a left-hand end edge 832 of the rear side wall 83 so as to protrude forwards from the left-hand end edge 832. The right-hand side wall 85 is formed as a wall extending in the front and rear direction. Thus, the right-hand side wall 85 is formed as a wall facing in the right and left direction. A circuit contact portion 86 protrudes downwards from the lower end of the right-hand side wall 85. The circuit contact portion 86 constitutes a contact structure that is electrically connected to the circuit board 42. Thus, the lower end of the right-hand side wall 85 is in contact with the upper surface of the circuit board 42. Like the right-hand side wall 85, the left-hand side wall 87 is also formed as a wall extending in the front and rear direction. Thus, the left-hand side wall 87 is also formed as a wall facing in the right and left direction. A circuit contact portion 88 protrudes downwards from the lower end of the left-hand side wall 87. The circuit contact portion 88 constitutes a contact structure that is electrically connected to the circuit board 42. Thus, the lower end of the left-hand side wall 87 is in contact with the upper surface of the circuit board 42.

The three-side support base body 81, constructed as described above, has a. U-shaped lower end edge supported by the circuit board 42, so that it acts so as to be supported by the circuit board 42 in a face-to-face contact relationship therewith, thus enhancing the rigidity the three-side support base body 81. The circuit contact portions 84, 86, and 88 may be embedded in the circuit board 42 so as to be integrated therewith. The three sides forming the U-shape of the lower end edge of the three-side support base body 81 thus integrated with the circuit board 42 are held in contact with the circuit board 42. As a result, the three-side support base body 81 is supported by the circuit board 42 in face-to-face contact relationship therewith, so that the three-side support base body 81 can be firmly supported by the circuit board 42. Further, because each of the three sides of the three-side support base body 81 is supported by the circuit board 42, the rigidity of the three-side support base body 81 can be also enhanced.

The contact forming portions 91 may be respectively connected to the right-hand side wall 85 and the left-hand side wall 87 of the three-side support base body 81 via upwardly extending extension portions 90. The rear side wall 83 of the three-side support base body 81 may have no such extension portion 90.

The extension portions 90 (901 and 902) are formed so as to upwardly extend respectively from the right-hand side wall 85 and the left-hand sidewall 87. More specifically, the right-hand side extension portion 901 extends upwardly from the right-hand side wall 85 while being inclined backwards therefrom. The left-hand side extension portion 902 extends upwardly from the left-hand side wall 87 while being inclined backwards therefrom. Thus, the right-hand side extension portion 901 and the left-hand side extension portion 902 are formed in wall configurations extending in the front and rear direction in the same manner as the right-hand side wall 85 and the left-hand side wall 87 that are located on the lower side. In this way, the right-hand side extension portion 901 and the left-hand side extension portion 902 are formed in plane-symmetry along the inserting direction. On the upper side of the right-hand side extension portion 901 and the left-band side extension portion 902, there are provided the contact forming portions 91 (911 and 912) that will be described below.

The contact forming portions 91 (911 and 912) may be formed on the upper side of the extension portions 90 (901 and 902) so as to be continuous therewith, respectively. More specifically, on the upper side of the right-hand side extension portion 901, there is provided a right-hand side contact forming portion 911 so as to be continuous therewith. On the upper side of the left-band side extension portion 902, there is provided a left-hand side contact forming portion 912 so as to be continuous therewith. The right-hand side contact forming portion 911 and the left-hand side contact forming portion 912 serve as terminals arranged so as to be opposed to each other. That is, the right-hand side contact forming portion 911 corresponds to one of side surface contact portions according to the present disclosure. The right-hand side contact forming portion 911 may serves as a portion forming an electrical contact when contacting with a right-hand side surface of a flat plate of the device side terminal 102. The left-hand side contact forming portion 912 corresponds to the other of the side surface contact portions according to the present disclosure. The left-hand side contact forming portion 912 may serve as a portion forming an electrical contact when contacting with the left-hand side surface of the flat plate of the device side terminal 102. That is, the left-hand side contact forming portion 912 may contact with the left-hand side surface on the side opposite the right-hand side surface of the device side terminal 102 that may contact with the right-hand side contact forming portion 911.

The right-hand side contact forming portion 911 and the left-hand side contact forming portion 912 may be formed substantially the same with each other except for the configuration related to leaf spring contact portions 94 (941 and 942) that will be described in detail later. The contact forming portions 91 (911 and 912) may respectively generally include extension support portions 92 (921 and 922) and leaf spring contact portions 93 and 96. The extension support portions 92 are formed so as to extend upwardly from the upper ends of the extension portions 90 (901 and 902). Like the extension portions 901 and 902, the extension support portions 921 and 922 are also formed so as to extend upwardly from the upper ends of the right-hand side wall 85 and the left-hand side wall 87 via the extension portions 901 and 902. More specifically, the right-hand side extension support portion 921 is formed so as to extend vertically upwards from the upper end of the right-hand side extension portion 901. The left-hand side extension support portion 922 is formed so as to extend vertically upwards from the upper end of the left-hand side extension portion 902. The right-hand side extension support portion 921 and the left-hand side extension support portion 922 extend so as to be parallel to each other.

The right-hand side extension support portion 921 and the left-hand side extension support portion 922 are respectively provided with a right-hand side leaf spring contact portion 93 and a left-hand side leaf spring contact portion 96 each extending forwards in a strip-like fashion. The extension support portions 92 (921 and 922) may serve as rear end side support pillars respectively supporting the right-hand side leaf spring contact portion 93 and the left-hand side leaf spring contact portion 96 that extend forwards. In this way, the right-hand side extension support portion 921 may be provided with the right-hand side leaf spring contact portion 93 extending forwards therefrom, and the left-hand side extension support portion 922 may be provided with the left-hand side leaf spring contact portion 96 extending forwards therefrom. Each of the leaf spring contact portions 93 and 96 is divided into two upper and lower parts that extend forwards in a strip-like fashion. More specifically, the right-hand side leaf spring contact portion 93 includes a right-hand side upper leaf spring contact portion 94 and a right-hand side lower leaf spring contact portion 95 that respectively constitute the upper part and the lower part of the two parts. The left-hand side leaf spring contact portion 96 includes a left-hand side upper leaf spring contact portion 97 and a left-hand side lower leaf spring contact portion 98 that respectively constitute the upper part and the lower part of the two parts. The right-hand side upper leaf spring contact portion 94 and the right-hand side leaf spring contact portion 95 may respectively have approaching inclined portions 941 and 951, and have reception guide portions 942 and 952. Similarly, the left-hand side upper leaf spring contact portion 97 and the left-hand side lower leaf spring contact portion 98 may respectively have approaching inclined portions 971 and 981, and have reception guide portions 972 and 982. The right-hand side extension support portion 921 serves as the rear end side support of the approaching inclined portions 941 and 951 of the right-hand side upper leaf spring contact portion 94 and the right-hand side lower leaf spring contact portion 95. The approaching inclined portions 941 and 951 have an inclined configuration approaching the left-hand side leaf spring contact portions. 96 as they extend forwards. On the other hand, the left-hand side extension support portion 922 serves as the rear end side support of the approaching inclined portions 971 and 981 of the left-hand side upper leaf spring contact portion 97 and the left-hand side lower leaf spring contact portion 98. The approaching inclined portions 971 and 981 have an inclined configuration approaching the right-hand side leaf spring contact portion 93 as they extend forwards. In this way, the approaching inclined portions 941, 951, 971, and 981 of the right-hand side leaf spring contact portion 93 and the left-hand side leaf spring contact portion 96 are formed such that the distance between the approaching inclined portions 941 and 971 and the distance between the approaching inclined portions 951 and 981 decrease as they extend forwards. More specifically, the approaching inclined portions 941, 951, 971, and 981 are configured such that the front end portions of the approaching inclined portions 941 and 971 are positioned so close to each other as to be in contact with each other and that the front end portions of the approaching inclined portions 951 and 981 are positioned so close to each other as to be in contact with each other. The front end portions of the approaching inclined portions 941, 951, 971, and 981 which are thus arranged so close to each other, respectively have electrical contacts 945, 955, 975, and 985 that can contact the flat-plate-like device side terminal 102 when the flat-plate-like device side terminal 102 is inserted.

Further, the reception guide portions 942, 952, 972, and 982 of the right-hand side leaf spring contact portion 93 and the left-hand side leaf spring contact portion 96 have a guide configuration facilitating the insertion of the flat-plate-like device side terminal 102 between the front end portions of the approaching inclined portions 941 and 971 and between the front end portions of the approaching inclined portions 951 and 981. More specifically, the reception guide portions 942, 952, 972 and 982 are curved such that the distance between the reception guide portions 942 and 972 and the distance between the reception guide portions 952 and 982 increases as they extend forwards. The reception guide portions 942, 952, 972, and 982 formed as described above perform a guide function for the flat-plate-like device side terminal 102 that is inserted between the opposing surfaces of the approaching inclined portions 941 and 971 and between the opposing surfaces of the approaching inclined portions 951 and 981. The front end portions of the approaching inclined portions 941, 951, 971, and 981 where the approaching inclined portions 941, 951, 971, and 981 are respectively connected to the reception guide portions 942, 952, 972, and 982 may be set as the electrical contacts 945, 955, 975, and 985.

The right-hand side contact forming portion 911 and the left-hand side contact forming portion 912 are arranged so as to be opposed to each other for forming the electrical contacts. That is, the right-hand side leaf spring contact portion 93 and the left-hand side leaf spring contact portion 96 are arranged so as to face each other. More specifically, the right-hand side upper leaf spring contact portion 94 and the left-hand side upper leaf spring contact portion 97 are arranged so as to face each other. Here, the right-hand side upper leaf spring contact portion 94 provides the electrical contact portion 945 when contacting with the flat-plate-like device side terminal 102. The left-hand side upper leaf spring contact portion 97 provides the electrical contact portion 975 when contacting with the flat-plate-like device side terminal 102. Further, the right-hand side lower leaf spring contact portion 95 and the left-hand side leaf spring contact portion 98 are also arranged so as to face each other. The right-hand side lower leaf spring contact portion 95 provides the electrical contact portion 955 when contacting with the flat-plate-like device side terminal 102. The left-hand side lower leaf spring contact portion 98 provides the electrical contact portion 985 when contacting with the flat-plate-like device side terminal 102. In this way, the right-hand side contact forming portion 911 and the left-hand side contact forming portion 912 have upper-stage contact portions providing the electrical contacts 945 and 975 and also have lower-stage contact portions providing the electrical contacts 955 and 985. Therefore, the right-hand side contact forming portion 911 and the left-hand side contact forming portion 912 are formed so as to provide two pairs of contact structures in two upper and lower stages. Thus, the right-hand side contact forming portion 911 and the left-hand side contact forming portion 912 can provide four electrical contacts 945, 955, 975, and 985 in total. The electrical contacts 945, 955, 975, and 985 correspond to the contact portions for contacting with the terminals. That is the vertical ranges (length) of the electrical contacts 945, 955, 975, and 985 correspond to the contact ranges where the terminal contacts according to the present disclosure. Here, the vertical contact ranges of the electrical contacts 945, 955, 975, and 985 may depend upon the vertical contact length at the right-hand side upper leaf spring portion 94, the vertical contact length at the left-hand side upper leaf spring portion 97, the vertical contact length at the right-hand side lower leaf spring portion 95, and the vertical contact length at the left-hand side lower leaf spring portion 98. Thus, the ranges (contact ranges) of the electrical contacts 945, 955, 975, and 985 depend upon the vertical contact length at the spring contact portions 94, 95, 97, and 98.

More specifically, the vertical contact range of the electrical contact 945 depends upon the vertical (contact) length "K1" of the right-hand side upper leaf spring contact portion 94. The vertical contact range of the electrical contact 955 depends upon the vertical (contact) length "K2" of the right-hand side lower leaf spring contact portion 95. The vertical contact range of the electrical contact 975 depends upon the vertical (contact) length "K3" of the left-hand side upper leaf spring contact portion 97. The vertical contact range of the electrical contact 985 depends upon the vertical (contact) length "K4" of the left-hand side lower leaf spring contact portion 98.

The vertical lengths "K1," "K2," "K3," and "K4" of the leaf spring contact portions 94, 95, 97, and 98 determining the vertical ranges of the electrical contacts 945, 955, 975, and 985 may be set as follows.

The vertical length "K1" of the right-hand side upper leaf spring contact portion 94 determining the contact range of the electrical contact 945 may be set to be larger than the vertical length "K3" of the left-hand side upper leaf spring contact portion 97 determining the contact range of the electrical contact 975 and arranged so as to face the right-hand side upper leaf spring contact portion 94. In this way, the vertical length "K1" of the right-hand side upper leaf spring contact portion 94 and the vertical length "K3" of the left-hand side upper leaf spring contact portion 97 may be set to be different from each other. The vertical length "K2" of the right-hand side lower leaf spring contact portion 95 determining the contact range of the electrical contact 955 may be set to be smaller than the vertical length "K4" of the left-hand side lower leaf spring contact portion 98 determining the contact range of the electrical contact 985 and arranged so as to face the right-hand side lower leaf spring contact portion 95. In this way, the vertical length "K2" of the right-hand side lower leaf spring contact portion 95 and the vertical length "K4" of the left-hand side lower leaf spring contact portion 98 may be set to be different from each other. The vertical length "K1" of the right-hand side upper leaf spring contact portion 94 may be set to be larger than the vertical length "K2" of the right-hand side lower leaf spring contact portion 95.

In addition, the vertical length "K1" of the right-hand side upper leaf spring contact portion 94 determining the contact range of the electrical contact 945 may be set to be the same length as the vertical length "K4" of the left-hand side lower leaf spring contact portion 98 determining the contact range of the electrical contact 985 and arranged diagonally to the right-hand side upper leaf spring contact portion 94. Further, the vertical length "K3" of the left-hand side upper leaf spring contact portion 97 determining the contact range of the electrical contact 975 may be set to be the same length as the vertical length "K2" of the right-hand side lower leaf spring contact portion 95 determining the contact range of the electrical contact 955 arranged diagonally to the left-hand side upper leaf spring contact portion 97. In this way, the vertical length "K1" of the right-hand side upper leaf spring portion contact portion 94 and the vertical length "K2" of the right-hand side lower leaf spring contact portion 95 arranged vertically in line with the right-hand side upper leaf spring portion contact portion 94 may be set to be different from each other. In addition, the vertical length "K3" of the left-hand side upper leaf spring contact portion 97 and the vertical length "K4" of the left-hand side lower leaf spring contact portion 98 arranged vertically in line with the left-hand side upper leaf spring contact portion 97 are set to be different from each other.

The battery pack 10 according to the embodiment described above provides the following effects: That is, in the above-described battery pack 10, the vertical length "K1" of the right-hand side upper leaf spring contact portion 94 (the contact range of the electrical contact 945) and the vertical length "K3" of the left-hand side upper leaf spring contact portion 97 (the contact range of the electrical contact 975) are set to be different from each other. As a result, when both the right-hand side upper leaf spring contact portion 94 and the left-hand side upper leaf spring contact portion 97 are respectively in contact with opposite side surfaces of the device side terminal 102, the electrical contact 945 and the electrical contact 975 may not cause simultaneous resonance even in the case that an external shock or vibration is applied to the terminal 80 to cause resonance. As a result, it is possible to ensure that at least one of the electrical contacts 945 and 975 is kept in contact with opposite side surfaces of the device side terminal 102, so that it is possible to make the electrical connection of the (battery side) terminal 80 to the device side terminal 102 more reliable. Similarly, the vertical length "K2 " of the right-hand side lower leaf spring contact portion 95 (the contact range of the electrical contact 955) and the vertical length "K4" of the left-hand side lower leaf spring contact portion 98 (the contact range of the electrical contact 985) are set to be lengths different from each other. As a result, when both the right-hand side lower leaf spring contact portion 95 and the left-hand side lower leaf spring contact portion 98 are respectively held in contact with both side surfaces of the device side terminal 102, even if the terminal 80 is allowed to undergo resonance due to an external shock or vibration, it is possible to prevent the electrical contact 955 and the electrical contact 985 held in contact from simultaneously undergoing resonance. As a result, it is possible to more reliably secure either of the electrical contacts 955 and 985 at both side surfaces of the device side terminal 102, so that it is possible to make the electrical connection of the (battery side) terminal 80 to the device side terminal 102 more reliable.

Further, in the above-described battery pack 10, the vertical length "K1" of the right-hand side upper leaf spring contact portion 94 and the vertical length "K2" of the right-hand side lower leaf spring contact portion 95 are set to be different from each other. Further, the vertical length "K3" of the left-hand side upper leaf spring contact portion 97 and the vertical length "K4" of the left-hand side lower leaf spring contact portion 98 are set to be different from each other. As a result, it is possible to make the electrical connection of the battery side terminal to the device side terminal more reliable.

Further, in the above-described battery pack 10, the vertical lengths "K1" and "K4" of the right-hand side upper leaf spring contact portion 94 and the left-hand side lower leaf spring contact portion 98, which are arranged diagonally to each other, are the same. In addition, the vertical lengths "K3" and "K2" of the left-hand side upper leaf spring contact portion 97 and the right-hand side lower leaf spring contact portion 95, which are arranged diagonally to each other, are the same. Therefore, it is possible to provide a balance in the diagonal direction of the electrical contacts with the device side terminal 102. Further, it is also possible to ensure a balance in contact forces applied from opposite surfaces of the device side terminal 102.

Figure 16:
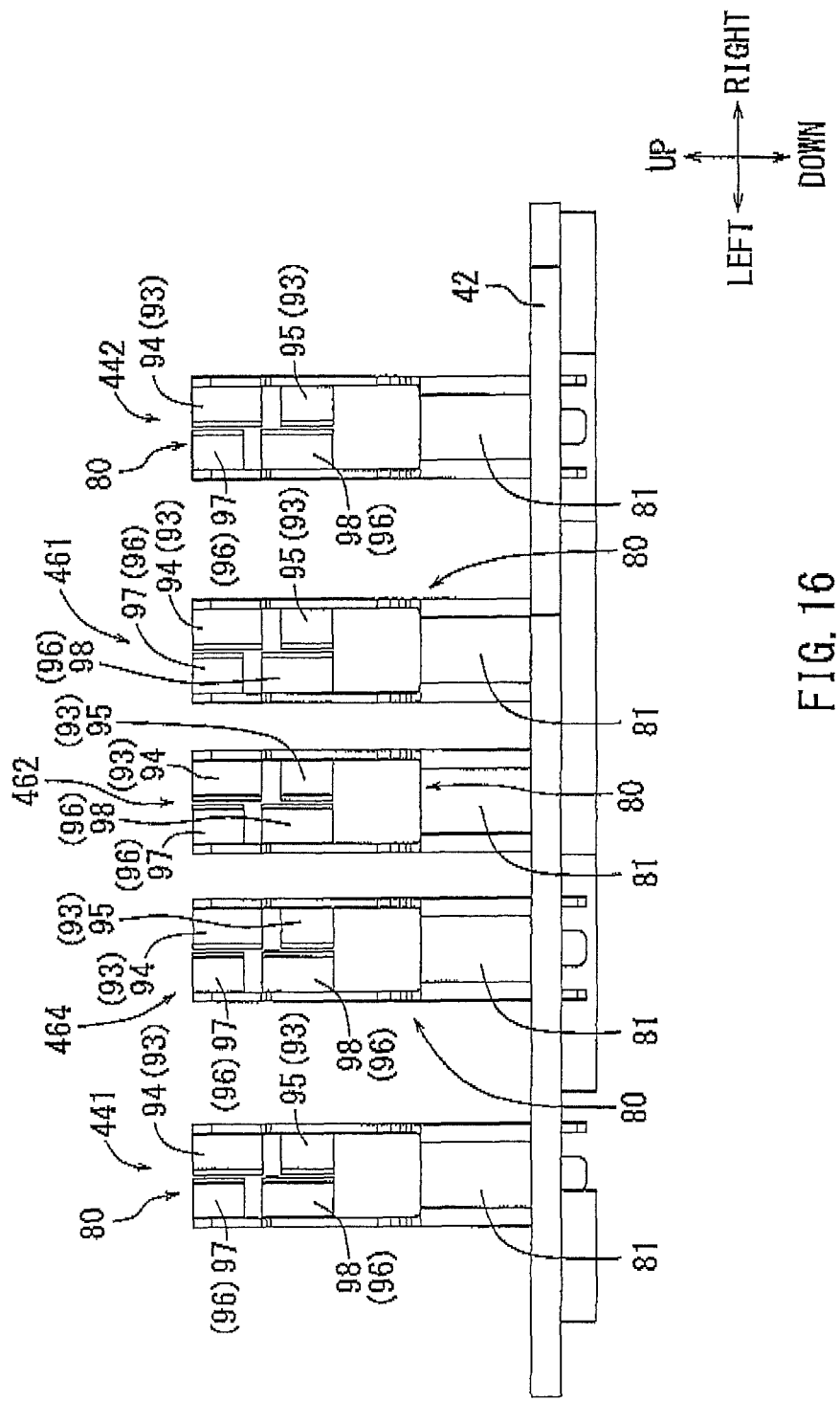
FIG. 16 is a plan view, as seen from the rear side, of a circuit board on which terminals as shown in FIG. 9 are provided.

Further, as shown in FIG. 16, mounting the terminals 80 that are the same components to the circuit board 42 can provide the recharging/discharging terminals 44 and the signal terminals 46. Here, each terminal 80 is enhanced in rigidity through the support by the three-side support base body 81, so that it is possible to reduce the arrangement range occupied by the terminal as compared with the conventional terminal. In addition, because the circuit board 42 can be integrated with the cell holder 50 by the board joining portions 52 (521 and 522), it possible to simplify the construction on the front side of the circuit board 42.

[Second Embodiment]

Next, second through fourth embodiments, which are modifications of the battery pack 10 according to the first embodiment, will be described with reference to FIGS. 17 through 19. The second through fourth embodiments described differ from the battery pack 10 of the first embodiment only in the determination of the lengths of the right-hand side upper leaf spring contact portion 94, the right-hand side lower leaf spring contact portion 95, the left-hand side upper leaf spring contact portion 97, and the left-hand side lower leaf spring contact portion 98 forming the terminal 80. Therefore, the following description will focused on the lengths of the leaf spring contact portions 94, 95, 97, and 98 of each of the terminals 80A through 80C according to the second through fourth embodiments. The components of the terminal 80 that are the same as those of the first embodiment will be indicated by the same reference numerals, and a description thereof will be omitted.

Figure 17:
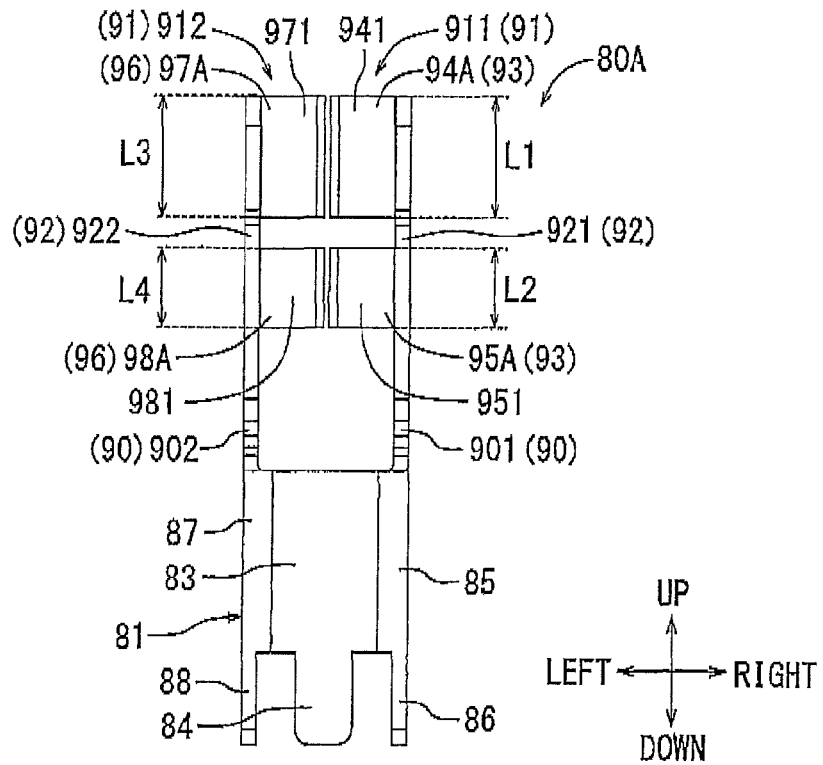
FIG. 17 is a plan view, as seen from the rear side, of a terminal according to a second embodiment.

FIG. 17 is a plan view of the terminal 80A according to the second embodiment as seen from the rear side. As stated above, in the second embodiment, the lengths of the leaf spring contact portions 94, 95, 97, and 98 differ from those of the terminal 80 according to the first embodiment. That is a vertical length "L1" of a right-hand side upper leaf spring contact portion 94A determining the contact range of the electrical contact 945 is set to be the same length as a vertical length "L3" of a left-hand side upper leaf spring contact portion 97A determining the contact range of the electrical contact 975 and arranged so as to face the right-hand side upper leaf spring contact portion 94A. Further, a vertical length "L2" of a right-hand side lower leaf spring contact portion 95A determining the contact range of the electrical contact 955 is set to be the same length as a vertical length "L4" of a left-hand side lower leaf spring contact portion 98A determining the contact range of the electrical contact 985 and arranged so as to face the right-hand side lower leaf spring contact portion 95A. The vertical length "L1" of the right-hand side upper leaf spring contact portion 94A is set to be a length larger than the vertical length "L2" of the right-hand side lower leaf spring contact portion 95A.

Here, the vertical length "L1" of the right-hand side upper leaf spring contact portion 94A determining the contact range of the electrical contact 945 is set to be longer than the vertical length "L4" of the left-hand side lower leaf spring contact portion 98A determining the contact range of the electrical contact 985 and arranged diagonally to the right-hand side upper leaf spring contact portion 94A. Further, the vertical length "L2" of the right-hand side lower leaf spring contact portion 95A determining the contact range of the electrical contact 955 is set to be longer than the vertical length "L2" of the right-hand side lower leaf spring contact portion 95A determining the contact range of the electrical contact 955 and arranged diagonally to the right-hand side lower leaf spring contact portion 95A.

Also the terminal 80A, constructed as described above, can achieve substantially the same effect as that of the terminal 80 according to the first embodiment. However, in the terminal of the first embodiment described above, the leaf spring contact portions arranged diagonally to each other are of the same length, whereas, in the terminal 80A of the second embodiment, the leaf spring contact portions arranged to be opposed each other are of the same length. With this difference, the following effect can be achieved: That is, in the case that the terminal 80A of the second embodiment is incorporated, the vertical lengths "L1" and "L3" of the right-hand side upper leaf spring contact portion 94 and the left-hand side upper leaf spring contact portion 97 arranged to be opposed to each other are of the same length, and the vertical lengths "L2" and "L4" of the right-hand side lower leaf spring contact portion 95 and the left-hand side lower leaf spring contact portion 98 arranged to be opposed to each other are also of the same length. Therefore, it is possible to make a balance in the facing direction of the electrical contacts with the device side terminal 102. Further, it is also possible to achieve a satisfactory balance in the contact forces applied from opposite surfaces of the device side terminal 102.

[Third Embodiment]

Figure 18:
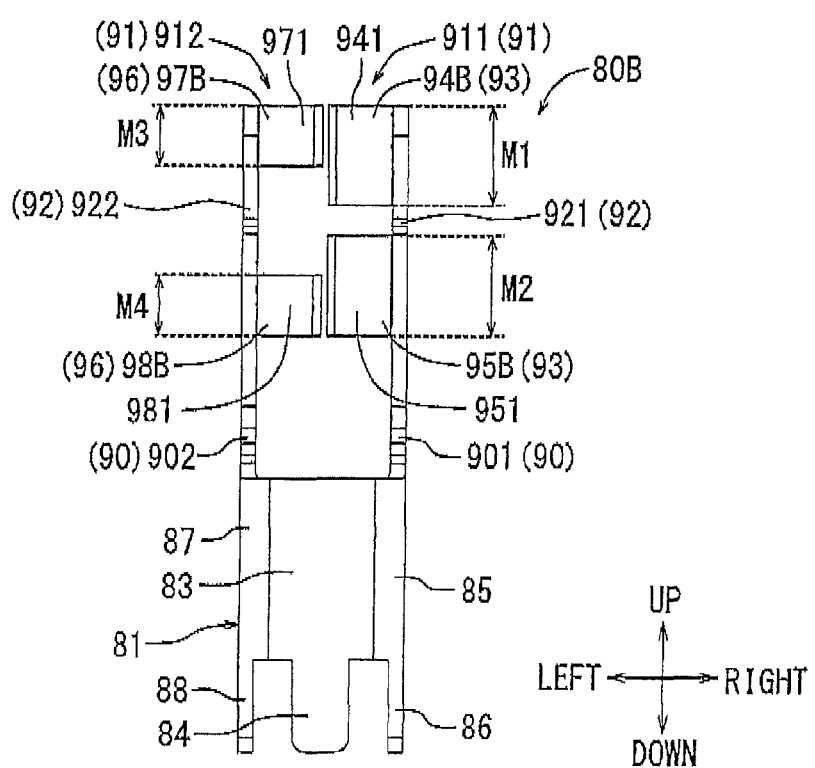
FIG. 18 is a plan view, as seen from the rear side, of a terminal according to a third embodiment.

FIG. 18 is a plan view of a terminal 80B according to the third embodiment as seen from the rear side. As stated above, also in this third embodiment, the lengths of the leaf spring contact portions 94, 95, 97, and 98 differ from those of the terminal 80 according to the first embodiment. That is, a vertical length "M1" of a right-hand side upper leaf spring contact portion 94B determining the contact range of the electrical contact 945 is set to be longer than a vertical length "M3" of a left-hand side upper leaf spring contact portion 97B determining the contact range of the electrical contact 975 and arranged so as to face the right-hand side upper leaf spring contact portion 94B. Further, a vertical length "M2" of a right-hand side lower leaf spring contact portion 95B determining the contact range of the electrical contact 955 is set to be longer than a vertical length "M4" of a left-hand side lower leaf spring contact portion 98B determining the contact range of the electrical contact 985 and arranged so as to face the right-hand side lower leaf spring contact portion 95B. The vertical length "M1" of the right-hand side upper leaf spring contact portion 94B is set to be of the same length as the vertical length "M2" of the right-hand side lower leaf spring contact portion 95B. Further, the vertical length "M3" of the left-hand side upper leaf spring contact portion 97B is set to be a length shorter than the vertical length "M4" of the right-hand side lower leaf spring contact portion 98B.

The terminal 80B, constructed as described above, can achieve substantially the same effect as that of the terminal 80 of the first embodiment described above. In the terminal 80 constructed described above, the total of the vertical lengths of the leaf spring contact portions on the left-hand side is larger than that on the right-hand side. From the viewpoint of a forming process, the terminal 80B is advantageous since it facilitates the forming process.

[Fourth Embodiment]

Figure 19:
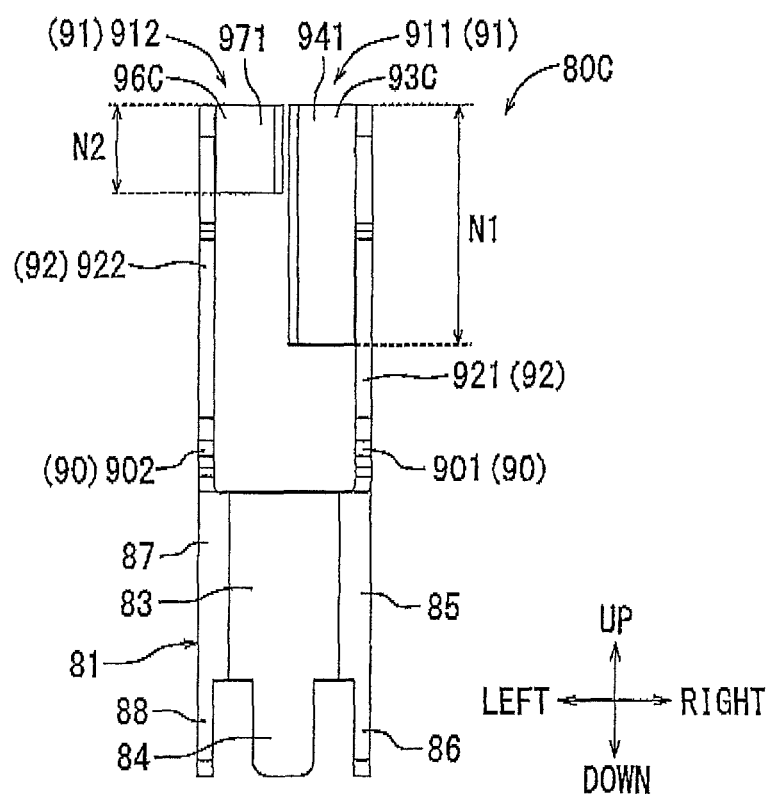
FIG. 19 is a plan view, as seen from the rear side, of a terminal according to a fourth embodiment.

FIG. 19 is a plan view of a terminal 80C according to the fourth embodiment as seen from the rear side. As compared with the terminal 80 of the first embodiment described above, in this fourth embodiment, the terminal 80C includes only a right-hand side upper leaf spring contact portion 93C and a left-hand side upper leaf spring contact portion 96C that are formed in an upper stage. Further, in the terminal 80C of the third embodiment, only the right-hand side upper leaf spring contact portion 94 and the left-hand side upper leaf spring contact portion 97 are left, with the right-hand side leaf spring contact portion 95 and the left-hand side lower leaf spring portion 98 being omitted. Here, a vertical length "N1" of the right-hand side upper leaf spring contact portion 93C determining the contact range of the electrical contact 945 is set to be longer than a vertical length "N2" of the left-hand side upper leaf spring contact portion 96C determining the contact range of the electrical contact 975 and arranged to be opposed to the right-hand side upper leaf spring contact portion 93C.

The terminal 80C constructed as described above also can achieve substantially the same effect as that of the terminal 80 of the first embodiment described above. However, as compared with the terminal 80 of the first embodiment, the terminal 80C of the fourth embodiment is of one step only. Therefore, it is advantageous in that it can be enhanced in terms of conduction performance in the normal condition,

[Other Possible Modifications]

The electric tool battery pack according to the present disclosure is not restricted to those of the above-described embodiments but allows modifications as appropriate as described below. That is, although in the above-described embodiments, the number of battery cells is set to five, the number of battery cells may not be limited but may be any other appropriate number. Further, the number of lead plates may also be determined according to the number of battery cells.

Further, in the above-described embodiments, the recharging/discharging terminals 44 function as charging terminals when the battery pack 10 is attached to the tool main body as the power source, and as recharging terminals when the battery pack 10 is attached to the charger. That is, the recharging/discharging terminals 44 are terminals that can be commonly used for recharging and discharging. However, it is possible to use different terminals for recharging terminals and for discharging terminals, i.e., to separate the terminals according to their uses.

Further, in the above-described embodiments, as the connection terminal structure for power transmission/reception and signal transmission/reception, the battery pack 10 side terminals are set as the battery side terminals, and the terminals on the side of the device main body such as the electric tool main body or the charger (indicated, for example, by numeral 100) are set as the device side terminals. More specifically, the battery side terminals are formed as female type connection terminals embodied as the terminals 80, 80A, 80B, and 80C. Therefore, the device side terminals are formed as male type connection terminals that can be inserted into the female type connection terminals. However, the male-female relationship of the connection terminals may be reversed from that of the above-described embodiments. That is the device side terminals may be formed as female type connection terminals embodied as the terminals 80, 80A, 80B, and 80C, and the battery side terminals may be formed as plate-like male type connection terminals that can be inserted into the female type connection terminals. In this case, the terminals 80, 80A, 80B, and 80C may be provided on the side of the device main body such as the electric tool main body or the charger (indicated by reference numeral 100).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A battery pack for detachably mounting to a device body of an electric tool or a charger, comprising:
   a battery side terminal electrically connectible with a device side terminal of the device body, the device side terminal being configured to have a shape of a flat plate and having a first side surface and a second side surface opposite to each other; wherein:
   the battery side terminal comprises a first contact portion and a second contact portion arranged to be opposed to each other, and a third contact portion and a fourth contact portion arranged to be opposed to each other, the first contact portion and the third contact portion being configured to form an electric contact through contact with the first side surface of the device side terminal, and the second contact portion and the fourth contact portion being configured to form an electric contact through contact with the second side surface of the device side terminal;
   the first contact portion is configured to contact the first side surface in a first contact range having a first length;
   the second contact portion is configured to contact the second side surface in a second contact range having a second length that is less than the first length;
   the first contact portion and the second contact portion extend in a first direction, and the first length and the second length extend in a second direction that is substantially perpendicular to the first direction;
   the third contact portion is configured to contact the first side surface in a third contact range having a third length;
   the fourth contact portion is configured to contact the second side surface in a fourth contact range having a fourth length that is less than the third length;
   the third contact portion and the fourth contact portion extend in the first direction, and the third length and the fourth length extend in the second direction; and
   the first contact range and the second contact range at least partly overlap with one another along the second direction, and the third contact range and the fourth contact range at least partly overlap one another along the second direction.

2. The battery pack according to claim 1, wherein the third length is the same as the first length.

3. The battery pack according to claim 2, wherein the fourth length is the same as the second length.

4. The battery pack according to claim 1, wherein the fourth length is the same as the second length.

5. The battery pack according to claim 1, comprising a plurality of battery side terminals each connectible with a corresponding device side terminal.

6. The battery pack according to claim 5, further comprising a circuit board, wherein the plurality of battery side terminals extend from the circuit board in a direction substantially perpendicular to a surface of the circuit board such that the plurality of battery side terminals extend parallel to each other and are arranged along a third direction that is substantially parallel to a surface of the circuit board.

7. The battery pack according to claim 6, wherein the plurality of battery side terminals extend in the second direction, and wherein the third direction is perpendicular to both the first direction and the second direction.

8. The battery pack according to claim 6, wherein at least one of the plurality of battery side terminals is directly connected to the circuit board.

9. The battery pack according to claim 5, further comprising at least one battery cell, wherein at least one of the plurality of battery side terminals is connected to a circuit board, and the at least one of the plurality of battery side terminals comprises a signal terminal configured to output a signal to the device body via the corresponding device side terminal.

10. The battery pack according to claim 1, further comprising a circuit board, wherein the battery side terminal is directly connected to the circuit board.

11. The battery pack according to claim 1, wherein the battery side terminal is a power terminal configured to transmit an electric power to the device body via the device side terminal.

12. The battery pack according to claim 1, wherein the first contact portion and the second portion are directly opposed to one another.

13. A battery pack for detachably mounting to a device body of an electric tool or a charger, comprising:
   a battery side terminal electrically connectible with a device side terminal of the device body, the device side terminal being configured to have a shape of a flat plate and having a first side surface and a second side surface opposite to each other; wherein:

the battery side terminal comprises a first contact portion and a second contact portion arranged to be opposed to each other, and a third contact portion and a fourth contact portion arranged to be opposed to each other, the first contact portion and the third contact portion being configured to form an electric contact through contact with the first side surface of the device side terminal, and the second contact portion and the fourth contact portion being configured to form an electric contact through contact with the second side surface of the device side terminal;

the first contact portion is configured to contact the first side surface in a first contact range having a first length;

the second contact portion is configured to contact the second side surface in a second contact range having a second length, the second length being different from the first length;

the first contact portion and the second contact portion extend in a first direction, and the first length and the second length extend in a second direction that is substantially perpendicular to the first direction;

the third contact portion is configured to contact the first side surface in a third contact range having a third length;

the fourth contact portion is configured to contact the second side surface in a fourth contact range having a fourth length, the fourth length being different from the third length;

the third contact portion and the fourth contact portion extend in the first direction, and the third length and the fourth length extend in the second direction; and the first contact range and the second contact range at least partly overlap with one another along the second direction, and the third contact range and the fourth contact range at least partly overlap one another along the second direction.

14. The battery pack according to claim 13, wherein:
the first contact portion and the fourth contact portion are arranged diagonally to each other; and
the fourth length is the same as the first length.

15. The battery pack according to claim 14, wherein:
the second contact portion and the third contact portion are arranged diagonally to each other; and
the third length is the same as the second length.

16. The battery pack according to claim 13, wherein the fourth length is different from the second length.

17. The battery pack according to claim 13, wherein:
the second contact portion and the third contact portion are arranged diagonally to each other; and
the second length is the same as the third length.

18. The battery pack according to claim 13, comprising a plurality of battery side terminals each connectible with a corresponding device side terminal.

19. The battery pack according to claim 18, further comprising a circuit board, wherein the plurality of battery side terminals extend from the circuit board in a direction substantially perpendicular to a surface of the circuit board such that the plurality of battery side terminals extend parallel to each other and are arranged along a third direction that is substantially parallel to a surface of the circuit board.

20. The battery pack according to claim 19, wherein the plurality of battery side terminals extend in the second direction, and wherein the third direction is perpendicular to both the first direction and the second direction.

21. The battery pack according to claim 20, wherein at least one of the plurality of battery side terminals is directly connected to the circuit board.

22. The battery pack according to claim 18, further comprising at least one battery cell, wherein at least one of the plurality of battery side terminals is connected to a circuit board, and the at least one of the plurality of battery side terminals comprises a signal terminal configured to output a signal to the device body via the corresponding device side terminal.

23. The battery pack according to claim 13, further comprising a circuit board, wherein the battery side terminal is directly connected to the circuit board.

24. The battery pack according to claim 13, wherein the battery side terminal is a power terminal configured to transmit an electric power to the device body via the device side terminal.

25. The battery pack according to claim 13, wherein the first contact portion and the second portion are directly opposed to one another.

* * * * *